United States Patent
Zhang et al.

(10) Patent No.: US 11,917,621 B2
(45) Date of Patent: *Feb. 27, 2024

(54) METHOD, DEVICE, AND APPARATUS FOR TRANSPORTING COMMON CONTROL INFORMATION

(71) Applicant: ZTE CORPORATION, Shenzhen (CN)

(72) Inventors: Shujuan Zhang, Shenzhen (CN); Zhaohua Lu, Shenzhen (CN); Yuhong Gong, Shenzhen (CN); Chuangxin Jiang, Shenzhen (CN); Xiaopeng Wang, Shenzhen (CN); Meng Mei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/835,891

(22) Filed: Jun. 8, 2022

(65) Prior Publication Data

US 2022/0303972 A1    Sep. 22, 2022

Related U.S. Application Data

(63) Continuation of application No. 16/338,410, filed as application No. PCT/CN2017/105332 on Oct. 9, 2017, now Pat. No. 11,405,892.

(30) Foreign Application Priority Data

Sep. 30, 2016 (CN) .......................... 201610879006.X

(51) Int. Cl.
*H04W 72/04* (2023.01)
*H04W 72/20* (2023.01)
(Continued)

(52) U.S. Cl.
CPC ............... *H04W 72/20* (2023.01); *H04L 5/00* (2013.01); *H04W 24/00* (2013.01); *H04W 72/0446* (2013.01)

(58) Field of Classification Search
CPC ....... H04L 5/00; H04L 5/0094; H04L 5/0053; H04W 72/0406; H04W 72/0446
See application file for complete search history.

(56) References Cited

U.S. PATENT DOCUMENTS 9,374,259 B2    6/2016   Tabet et al.
2017/0332359 A1*  11/2017   Tsai .................... H04W 72/046
(Continued)

FOREIGN PATENT DOCUMENTS

CN    101119277 A    2/2008
CN    101137134 A    3/2008
(Continued)

OTHER PUBLICATIONS

"Method of DL Control Channel Transmission and Reception in New Rat", Specification for U.S. Appl. No. 62/335,031 related to US 2019/0159230 A1, pp. 1-15. (Year: 2016).
(Continued)

*Primary Examiner* — Shukri Taha
(74) *Attorney, Agent, or Firm* — Morgan, Lewis & Bockius LLP

(57) ABSTRACT

A method for transporting common control information includes: transmitting, by a transmitting end, to the common control information on M time-domain resources through M transmission beams, where each of the M time-domain resources includes N time-domain symbols. One time-domain resource of the M time-domain resources where the common control information of each of the M transmission beams is located is respectively determined according to a beam index of a transmission beam, wherein M and N are (Continued)

positive integers. One of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel.

20 Claims, 9 Drawing Sheets

(51) Int. Cl.
  *H04W 72/0446* (2023.01)
  *H04L 5/00* (2006.01)
  *H04W 24/00* (2009.01)

(56) References Cited

U.S. PATENT DOCUMENTS

2018/0124743 A1* 5/2018 Seo .................. H04L 5/0053
2019/0159230 A1   5/2019 Kim
2019/0182682 A1   6/2019 Kim
2019/0182784 A1   6/2019 Harada

FOREIGN PATENT DOCUMENTS

| CN | 102724757 A | 10/2012 |
| CN | 103096379 A | 5/2013 |
| CN | 103716888 A | 4/2014 |
| CN | 105188140 A | 12/2015 |
| CN | 105874862 A | 8/2016 |
| EP | 2 512 051 A2 | 10/2012 |

OTHER PUBLICATIONS

Alcatel-Lucent et al.: "Considerations on Common Control Messages for LC-MTC" 3GPP TSG RAN WG1 Meeting #82-bis; R1-156055; Oct. 9, 2015; Malmo, Sweden.

First Office Action for CN Appl. No. 201610879006, dated May 27, 2021.

International Search Report and Written Opinion for PCT/CN2017/105332, dated Jan. 8, 2018, 10 pages.

* cited by examiner

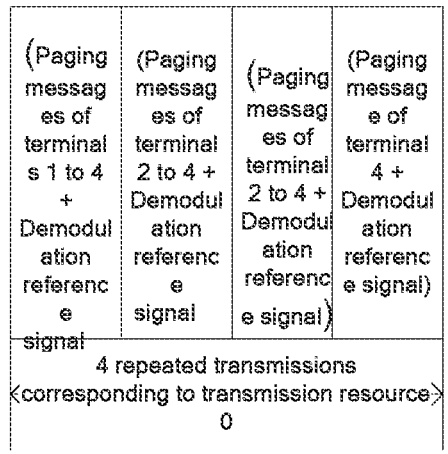
FIG. 9d
| Terminal 4 | Terminal 4 | Terminal 4 | Terminal 4 |
|---|---|---|---|
| Terminal 3 | Terminal 3 | Terminal 3 | |
| Terminal 2 | Terminal 2 | Terminal 2 | |
| Terminal 1 | | | |
| 4 repeated transmissions corresponding to transmission resource 0 | | | |
FIG. 9e
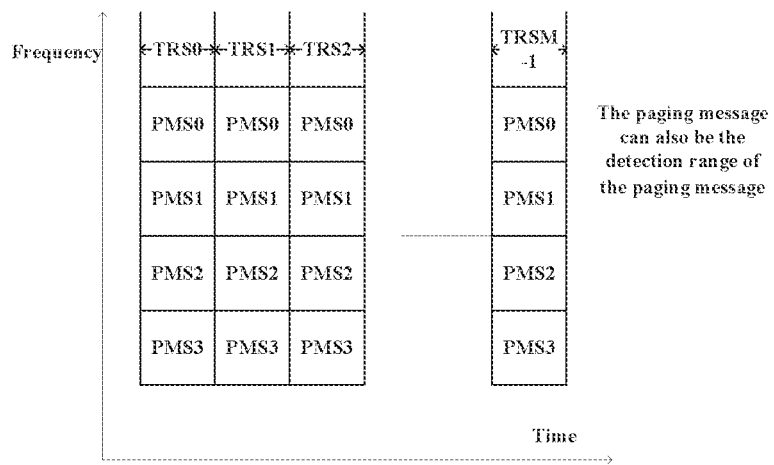
FIG. 9f

METHOD, DEVICE, AND APPARATUS FOR TRANSPORTING COMMON CONTROL INFORMATION

CROSS REFERENCE TO RELATED APPLICATIONS

This is a continuation of U.S. application Ser. No. 16/338,410, filed on Mar. 29, 2019, now U.S. Pat. No. 11,405,892, which is a National Stage Application, filed under 35 U.S.C. 371, of International Patent Application No. PCT/CN2017/105332 filed on Oct. 9, 2017, which claims priority to Chinese patent application No. 201610879006.X filed on Sep. 30, 2016, the contents of each of which are incorporated herein by reference in their entireties.

TECHNICAL FIELD

The present disclosure relates to mobile communications and relates to, for example, a method, apparatus and device for transporting common control information.

BACKGROUND

The use of high frequencies (6 GHz to 100 GHz) for communication is one of the core technical means in the future communication industry. High-frequency communication is one of the developing directions of New Radio (NR) enhancement. High-frequency communication is characterized by being beam-based and tends to use a hybrid beam, that is, a combination of a radio frequency beam and a baseband beam. One feature of the radio frequency beam is that one radio frequency link on one Orthogonal Frequency Division Multiplexing (OFDM) symbol corresponds to one radio-frequency beam direction. Therefore, when different beam directions are involved, multiple OFDM symbols are needed.

Common control information is transmitted as needed, in which case a scanning beam can cover the entire cell. If the Long Term Evolution (LTE) technology is adopted, only through multiple subframes can the scanning beam cover the entire cell. The transmission beams of multiple subframes are polled, limiting the scheduling of data signals. Therefore, it is urgent to provide a method, apparatus and device for transporting common control information to solve the problem in the process of transmitting common control information during the preceding high-frequency communication.

SUMMARY

A method, apparatus and device for transporting common control information are provided to solve the problem in transmission of common control information during high-frequency communication.

A method for transporting common control information includes:
  transmitting, by a transmitting end, the common control information on M time-domain resources through M transmission beams, where each of the M time-domain resources includes N time-domain symbols, where
  one time-domain resource of the M time-domain resources where the common control information of each of the M transmission beams is located is respectively determined according to a beam index of the each transmission beam, wherein M and N are positive integers; and
  one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel.

Optionally, the N time-domain symbols of each of the M time domain resources have Y types of subcarrier spacing, and Y is an integer greater than 1.

Optionally, the common control information and at least one of the following are frequency-division multiplexed: the synchronization signal, the broadcast channel, or a measurement reference signal.

Optionally, the M*N time-domain symbols included in the M time-domain resources of the common control information are distributed over more than one time unit, and number of time-domain symbols occupied by the M*N time-domain symbols in each of the more than one time unit is less than a number of time-domain symbols of the each time unit.

Optionally, the method satisfied at least one of the following:
  the M*N time-domain symbols included in the M time-domain resources of the common control information are distributed in continuous multiple time units; or
  the M*N time-domain symbols included in the M time-domain resources of the common control information are distributed in multiple time units and each of the multiple time units includes N1 time-domain symbols of the M*N time-domain symbols, wherein N1 is an integer less than M*N;
  the M*N time-domain symbols included in the M time-domain resources of the common control information are divided into [(M*N)/T1] subunits, and the [(M*N)/T1]subunits are equally spaced, wherein T1 denotes a maximum number of time-domain symbols included in one subunit, and T1 is an integer greater than or equal to 1;
  M1 time-domain resources among the M time-domain resources of the common control information are located at a beginning of a downlink transmission domain in one time unit, and the one time unit includes M3 time-domain resources among the M time-domain resources, wherein M1 and M3 are positive integers less than M; or
  an interval between a starting symbol of each time-domain resource of the M time-domain resources of the common control information and a starting symbol of a time unit where the each time-domain resource is located is 0 and the time unit includes M3 time-domain resources of the M time-domain resources, wherein M3 is an positive integers less than M.

Optionally, one time-domain resource where the common control information of each of the M transmission resources beams is located is respectively determined according to a beam index of the each transmission beam and the value of N.

Optionally, the value of N is obtained according to the following information: a system bandwidth and subcarrier spacing;
  the value of N belongs to a set having at least two positive integers; and
  the value of N is transmitted to a receiving end in the broadcast channel.

Optionally, the method further includes:
obtaining a minimum index symbol among N time-domain symbols of $i^{th}$ time domain resource of the M time domain resources according to i*N, where 0≤i≤M−1, wherein $i^{th}$ time domain resource of the M time domain resources corresponds to $i^{th}$ transmission beam of the M transmission beams.

Optionally, each T first time units includes one time-domain resource set, and the one time-domain resource set is composed of the M time-domain resources, where T is an integer multiple of a transmission period of a first common signal, and the first common signal includes the following signals: the synchronization signal, and the broadcast signal.

Optionally, the common control information comprises at least one of the following:
a common message; and
a common control signaling for indicating configuration information about the common message;
wherein the common message comprises at least one of the following: broadcast information, system message, paging message, or Random Access Response (RAR) message A method for transporting common control information includes:
determining, by a receiving end, a time-domain resource where the common control information of a transmission beam is located according to a beam index of the transmission beam;
detecting, by the receiving end, the common control information in the determined time-domain resource;
wherein the time-domain resource is a time-domain resource of M time-domain resources of the common control information and each of the M time-domain resources comprises N time-domain symbols;
the transmission beam is a transmission beam of M transmission beams and each of the M transmission beams corresponds to one time-domain resource of the M time-domain resources of the common control information; and
one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel;
wherein M and N are positive integers.

Optionally, the method further includes:
determining, by the receiving end, a beam index of the transmission beam where the receiving end is located, and detecting only common control information in a time-domain resource corresponding to the transmission beam where the receiving end is located among the M time-domain resources;
determining, by the receiving end, the transmission beam where the receiving end is located according to the synchronization signal.

Optionally, the N time-domain symbols of each of the M time domain resources have Y types of subcarrier spacing, and Y is an integer greater than 1; and the common control information and at least one of the following are frequency division multiplexed: the synchronization signal, the broadcast channel, or a measurement reference signal.

Optionally, the M*N time-domain symbols included in the M time-domain resources of the common control information are distributed over more than one time unit, and a number of time-domain symbols occupied by the M*N time-domain symbols in each of the more than one time unit is less than a number of time-domain symbols of the each time unit.

Optionally, the method satisfied at least one of the following:
the M*N time-domain symbols included in the M time-domain resources of the common control information are distributed in continuous multiple time units;
the M*N time-domain symbols included in the M time-domain resources of the common control information are distributed in multiple time units and each of the multiple time units includes N1 time-domain symbols of the M*N time-domain symbols, wherein N1 is an integer less than M*N;
the M*N time-domain symbols included in the M time-domain resources of the common control information are divided into [(M*N)/T1] subunits, and the [(M*N)/T1]subunits are equally spaced, wherein T1 denotes a maximum number of time-domain symbols included in one subunit, and T1 is an integer greater than or equal to 1;
M1 time-domain resources among the M time-domain resources of the common control information are located at a beginning of a downlink transmission domain in one time unit, and the one time unit includes M3 time-domain resources among the M time-domain resources, wherein M1 and M3 are positive integers less than M; or
an interval between a starting symbol of each time-domain resource of the M time-domain resources of the common control information and a starting symbol of a time unit where the each time-domain resource is located is 0 and the time unit includes M3 time-domain resources of the M time-domain resources, wherein M3 is an positive integers less than M.

Optionally, one time-domain resource where the common control information of each of the M transmission resources beams is located is respectively determined according to a beam index of the each transmission beam and the value of N.

Optionally, the value of N is obtained according to the following information: a system bandwidth and subcarrier spacing; the value of N belongs to a set having at least two positive integers; and the value of N is transmitted to the receiving end in the broadcast channel.

Optionally, the method further comprises: obtaining a symbol having a minimum index among N time-domain symbols of $i^{th}$ time domain resource of the M time domain resources according to i*N, wherein 0≤i≤M−1, wherein $i^{th}$ time domain resource of the M time domain resources corresponds to $i^{th}$ transmission beam of the M transmission beams.

Optionally, each T first time units includes one time-domain resource set, and the one time-domain resource set is composed of the M time-domain resources, wherein T is an integer multiple of a transmission period of a first common signal, and the first common signal comprises the following signals: the synchronization signal, and the broadcast channel.

Optionally, the common control information comprises at least one of the following: a common message; and a common control signaling for indicating configuration information about the common message;

wherein the common message comprises at least one of the following: broadcast information, system message, paging message, or Random Access Response (RAR) message.

An apparatus for transporting common control information, comprising a processor and a storage device, wherein the storage device stores a computer program executable by the processor, and the computer program:

a transmitting module configured to transmit the common control information on M time-domain resources through M transmission beams, wherein each of the M time-domain resources comprises N time-domain symbols, wherein one time-domain resource where the common control information of each of the M transmission beams is located is respectively determined according to a beam index of the each transmission beam, wherein M and N are positive integers; and one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel.

An apparatus for transporting common control information, comprising a processor and a storage device, wherein the storage device stores a computer program executable by the processor, and the computer program:

a receiving module configured to determine a time-domain resource where the common control information of a transmission beam is located according to a beam index of the transmission beam and detect the common control information in the determined time-domain resource;

wherein the time-domain resource is a time-domain resource of M time-domain resources of the common control information and each of the M time-domain resources comprises N time-domain symbols;

the transmission beam is a transmission beam of M transmission beams and each of the M transmission beams corresponds to one time-domain resource of the M time-domain resources of the common control information; and one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel;

wherein M and N are positive integers.

A network node includes the apparatus for transporting common control information as described above.

A terminal includes the apparatus for transporting common control information as described above.

A computer-readable storage medium is configured to store computer-executable instructions for executing the preceding method.

A terminal includes: at least one processor; and a memory communicatively connected to the at least one memory. The memory stores instructions executable by the at least one processor. The at least one processor executes the instructions to execute the preceding method.

A network node includes: at least one processor; and a memory communicatively connected to the at least one memory. The memory stores instructions executable by the at least one processor, and the at least one processor executes the instructions to execute the preceding method.

BRIEF DESCRIPTION OF DRAWINGS

FIG. 9d illustrates an example in which paging messages transmitted in different time-domain units transmitted repeatedly in time division of the same transmission resource are different according to an embodiment of the present disclosure;

FIG. 9e illustrates an example in which paging messages transmitted in different time-domain units transmitted repeatedly in time division of the same transmission resource are different and multiple paging messages can be transmitted simultaneously in the same time-domain unit according to an embodiment of the present disclosure;

FIG. 9f illustrates an example in which multiple users that allow transmitting a paging message in the same time-domain unit are divided into multiple frequency-division groups according to user identification numbers according to an embodiment of the present disclosure;

DETAILED DESCRIPTION

Figure 1:
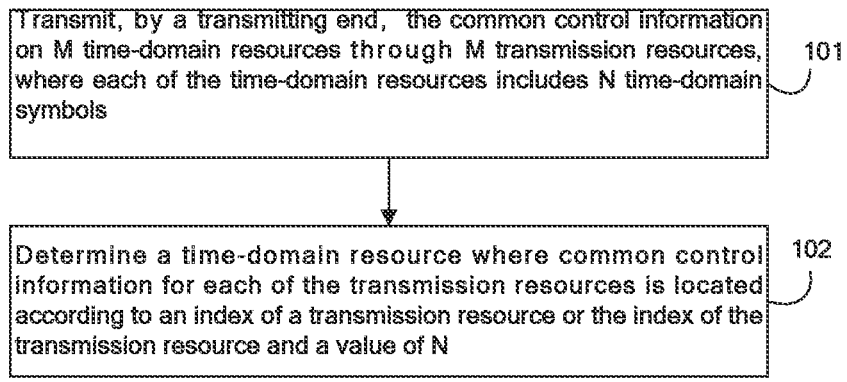
FIG. 1 is flowchart one of a method for transporting common control information according to an embodiment of the present disclosure.

FIG. 1 is a flowchart of a method for transporting common control information according to an embodiment of the present disclosure. As shown in FIG. 1, the method includes the steps described below.

In step 101, the common control information is transmitted on M time-domain resources through M transmission resources, where each of the time-domain resources includes N time-domain symbols.

In step 102, a time-domain resource where the common control information of each of the transmission resources is located is determined according to a resource index of the transmission resource or determined according to the resource index of the transmission resource and a value of N, and M and N are positive integers.

A transmitting end transmits the common control information on M time-domain resources through M transmission resources, where each of the time-domain resources includes N time-domain symbols, where the time-domain resource where common control information of each of the transmission resources is located is determined according to the resource index of the transmission resource or determined according to the resource index of the transmission resource and the value of N.

In an embodiment, the common control information includes at least one of the following information: a common message; and a common control signaling for indicating configuration information about the common message.

The common message may include at least one of the following information: broadcast information, a system message, Random Access Response (RAR) information, Transmission Power Control (TPC) information and a paging message.

The common control message may include a system message, a paging message, a Random Access Response (RAR) message and a Radio Resource Management (RRC) message. The common message may also be at least one of the system message and the common control message.

In an embodiment, the common control signaling is transmitted on first Z time-domain symbols of the N time-domain symbols, where Z is an integer greater than or equal to 1, and Z is less than or equal to N.

In an embodiment, the common message and the common control signaling are transmitted on the N symbols.

In an embodiment, the total number of repeated transmissions of the common control signaling is greater than or equal to the total number of repeated transmissions of the common message.

In an embodiment, one time-domain symbol may include the common control signaling and the common message.

In an embodiment, an intersection exists between a demodulation reference signal resource of the common control signaling and a demodulation reference signal resource of the common message.

In an embodiment, the common control signaling is located in an intermediate frequency-domain position of the time-domain symbol (that is, an intermediate position of a system bandwidth).

In an embodiment, a difference between the total number of subcarriers on one side of the common control signaling and the total number of subcarriers on the other side of the common control signaling is less than a predetermined threshold.

Optionally, the N time-domain symbols have Y types of subcarrier spacing, where Y is an integer greater than 1.

In an embodiment, subcarrier spacing of the time-domain symbols where the common control signaling is located is greater than subcarrier spacing of the time-domain symbols where the common message is located.

In an embodiment, the value of the Y is 2.

In an embodiment, the time-domain symbols having greater subcarrier spacing are ahead of the time-domain symbols having less subcarrier spacing.

In an embodiment, subcarrier spacing of the time-domain symbols where the measurement reference signal is located is greater than subcarrier spacing of time-domain symbols where the common control information is located.

When the common control information includes the common message, the method further includes:
    determining a length of the common control information and transmitting the common message based on the determined length,
    where the length of the common message belongs to a set pre-agreed by the transmitting end and a receiving end.

When the common control information includes the common message, the method further includes: determining a length of the common control information, and transmitting the common message the length of which is the same as the length of the common control information.

Optionally, the method further includes: determining the length set of the common message according to the value of N.

Optionally, the method further includes: determining the total number L of units included in one common control information. When L is greater than 1, each of the units includes one sub-block of the common message and the common control signaling, where the common control signaling includes at least one of the following information: information indicating whether a current unit is a last unit, information indicating a unit index of the current unit, a total number of units, a time-frequency resource occupied by a next unit, and Modulation and Coding Scheme (MCS) information of the next unit.

Optionally, the common control information and at least one of a synchronization signal, a broadcast channel and a second level measurement reference signal are frequency-division multiplexed.

In an embodiment, N time-domain symbols included in one time-domain resource are divided into [N/T] subunits, and the subunits are equally spaced, where T denotes a maximum number of time-domain symbols included in one subunit, / denotes a division operator, and [ ] denotes a rounding operator.

In an embodiment, M*N time-domain symbols included in the M time-domain resources are divided into [(M*N)/T1] subunits, and the subunits are equally spaced, where T1 denotes a maximum number of time-domain symbols included in one subunit, and * denotes a multiplication operator.

In an embodiment, the M*N time-domain symbols are distributed over one or more subframes, and the M*N time-domain symbols occupy part of symbols of each subframe.

In the preceding embodiments, T and T1 are integers greater than or equal to 1.

In an embodiment, the value of N is obtained according to at least one of the following information: a system bandwidth, subcarrier spacing, the total number of subcarriers included in one symbol, a length of the common control information, and a maximum number of receiving manners of a receiving end corresponding to the common control information.

In an embodiment, the value of N belongs to a set having at least two positive integers.

Optionally, the set is preset, or is obtained from a broadcast message, or is obtained according to a system bandwidth. The value of N can also be obtained according to the system bandwidth.

Optionally, the method further includes: transmitting the value of N to a receiving end.

The transmitting the value of N to a receiving end may include:

transmitting the value of N in the common control information to the receiving end.

Optionally, the method further includes:

obtaining a minimum index symbol among N time-domain symbols corresponding to an ith transmission resource according to i*N, where $0 \le i \le M-1$; or obtaining the N time-domain symbols corresponding to the ith transmission resource according to (M*n+i), where $0 \le i \le M-1$, $0 \le n \le -1$.

The obtaining the minimum index symbol among the N time-domain symbols corresponding to the ith transmission resource according to i*N may include: determining a time-domain symbol set and determining a logical index of each transmission resource in the time-domain symbol set.

Optionally, when the common control information is transmitted, the method further includes:

determining a length of the common control information and transmitting the common control information based on the determined length, where the length of the common control information belongs to a set pre-agreed by a base station and a receiving end.

Optionally, the method further includes: determining the set of length of the common control information according to the value of N.

Optionally, the method further includes:

determining the total number L of units included in one common control information, and when L is greater than 1, including at least one of the following information in each unit: information indicating whether a current unit is a last unit, information indicating a unit index of the current unit, and a total number of units.

Optionally, M1 time-domain resources (any position before M2 symbols) among the M time-domain resources are located at the beginning of the downlink transmission domain or part of time-domain symbols in the M1 time-domain resources are located at the beginning of the downlink transmission domain, M2 time-domain resources among the M time-domain resources are at an end of the downlink transmission domain, the M1 time-domain resources and the M2 time-domain resources are separated by x time-domain symbols, and x is an integer greater than 0, where M1+M2=M or M1+M2<M, and M1 and M2 are integers.

Optionally, among the M1 time-domain resources, resources in a beginning position of the downlink transmission domain include common control signaling, and the common control signaling in each time-domain resource indicates a time-frequency resource occupied by a common message in the time-domain resource, where the time-frequency resource occupied by the common message is a resource in the x time-domain symbols, or the time-frequency resource occupied by the common message is a resource in the x time-domain symbols and in the time-domain resources in the beginning position of the downlink transmission domain.

Optionally, a demodulation reference signal port in the M2 time-domain resources carries information about an index of the transmission resource.

Optionally, a demodulation reference signal port in the M1 time-domain resources does not carry information about the index of the transmission resource.

Optionally, among the M2 time-domain resources, the total number of time-domain resources on which transmission is allowed for each transmission resource is M1.

Optionally, one transmission resource is used to perform transmission on one of the M time-domain resources.

Optionally, the M time-domain resources are located at an end of a downlink transmission domain.

Optionally, a one-to-one correspondence exists between the M transmission resources and M synchronization signals.

Optionally, a one-to-one correspondence exists between the M transmission resources and M time-domain resources of a broadcast channel.

Optionally, a one-to-one correspondence exists between the M transmission resources and M time-domain resources of a measurement reference signal, where one time-domain resource of the measurement reference signal includes at least one measurement reference signal port.

Optionally, each time-domain synchronization signal corresponds to one or more of the M transmission resources.

Optionally, the correspondence may be a quasi-co-location relationship. For example, a correspondence between a transmission resource and a synchronization signal indicates that a quasi-co-location relationship exists between the transmission resource and the synchronization signal or indicates that the demodulation reference signal of the common control information transmitted by using the transmission resource and the synchronization signal satisfy the quasi-co-location relationship. The quasi-co-location relationship between two signals indicates that the channel large-scale information of the first signal can be deduced from the channel large-scale information or channel characteristic parameters of the second signal.

The channel large-scale information or channel characteristic parameters include at least one of the following information: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, and central horizontal angle of arrival.

Optionally, the correspondence may also be related a receiving spatial parameter (Rx Spatial Parameter). The Rx Spatial Parameter includes at least one of the following parameters: an angle of arrival (AoA) of a receiving end signal, a Dominant AoA (Dominant AoA, average AoA) of the receiving end signal, Power Angular Spectrum (PAS) of the AoA of the receiving end signal, PAS of AoD, a transmit/receive channel correlation, transmit/receive beamforming, and a spatial channel correlation.

Optionally, the correspondence may also be related to a transmission beam or a transmit spatial filter. For example, a correspondence between a transmit resource and a synchronization signal indicates that the transmission beam or the transmit spatial filter of the transmit resource is the same as or similar to the transmission beam or the transmit spatial filter of the synchronization signal or indicates that the transmission beam or the transmit spatial filter of the demodulation reference signal of the common control message transmitted using this transmission resource is the same as or similar to the transmission beam or the transmit spatial filter of the synchronization signal.

One synchronization signal may be one SS block. The synchronization signal of one cell is transmitted through one or more SS blocks.

Optionally, different ones of the transmission resources are distinguished from each other by at least one of the following resource types: a transmission beam resource, a transmission antenna resource, a transmission port resource, a transmission frequency-domain resource, a transmission sequence resource and a transmission time-domain resource.

Optionally, different ones of the transmission resources are distinguished from each other by at least one of the following: a transmission beam, a transmission antenna, a transmission port, a frequency-domain resource corresponding to a transmitting reference signal, a sequence resource corresponding to the transmitting reference signal, and a time-domain resource corresponding to the transmitting reference signal.

Optionally, in one set of time-domain resources, a coding rate of the common control information is fixed.

Optionally, the total number of aggregation degrees corresponding to one common control information in one time-domain resource is 1.

Optionally, the total number of candidate control channel resources included in one search space per aggregation degree is 1.

Optionally, at least one of an aggregation degree corresponding to one common control information in one time-domain resource and the total number of candidate control channel resources included in one search space per aggregation degree is determined by at least one of the following manners:

a manner of being notified by first-level common control information;

a manner of being determined by a system bandwidth;

a manner of being determined by the total number of demodulation reference signal ports corresponding to the one time-domain resource; and notifying the aggregation degree and the total number of the candidate control channels per aggregation degree.

Optionally, each T first time units have one time-domain resource set, and the time-domain resource set is composed of the M time-domain resources, where T is an integer multiple of a transmission period of a first common signal, and the first common signal may include at least one of the following signals: a synchronization signal, a broadcast signal and a measurement reference signal.

Optionally, the first time unit is a radio frame.

An embodiment provides a method for transporting common control information. The method includes:

transmitting, by a transmitting end, the common control information on M time-domain resources, where the M is a positive integer. The M time-domain resources may be discrete time-domain resources.

One time-domain resource may include common control information and at least one of the following: indication information indicating configuration information about a paging message, a demodulation reference signal, and a measurement reference signal.

Optionally, in one time-domain resource, the measurement reference signal and the common control information are transmitted in time division mode.

Optionally, in one time-domain resource, the measurement reference signal is transmitted before the common control information.

Optionally, in one time-domain resource, the total number of repeated transmissions of the measurement reference signal is greater than or equal to the total number of repeated transmissions of the common control information.

Optionally, the total number of repeated transmissions of the common control information is 1.

Optionally, the total number of repeated transmissions of one measurement reference signal belongs to a set pre-agreed by the transmitting end and a receiving end.

Optionally, when the measurement reference signal is repeatedly transmitted, M transmission resources are first sequentially transmitted and then the M transmission resources are sequentially transmitted such that the M transmission resources are repeatedly transmitted.

Optionally, when the common control information is a paging message, the M time-domain resources constitute one paging opportunity.

Optionally, the total number of repeated transmissions of at least one of the measurement reference signal and the common control information in the one of the M time-domain resources is $x2*R$, where $x2$ is an integer greater than 0, R is a maximum number of receiving manners of all receiving ends corresponding to the paging opportunity, or R is a maximum number of receiving manners of all receiving ends included in a currently transmitted paging message in the paging opportunity.

Optionally, in the one paging message transmission opportunity, paging messages of all receiving ends are allowed to be transmitted.

Optionally, all receiving ends corresponding to the one paging opportunity are composed of receiving ends allowed to be paged in the paging opportunity, and all receiving ends included in the currently transmitted paging message in the paging opportunity are composed of all receiving ends paged in the currently transmitted paging message.

Optionally, the total number of repeated transmissions of one common control information is Re1, indicating that the one common control information is transmitted on Re1 time-domain units, where corresponding information on different time-domain units is independently coded, or corresponding information before channel coding on the different time-domain units is the same, where the common control information is a common message, or is a common control signaling for indicating configuration information about the common message.

The total number of repeated transmissions of one measurement reference signal is Re2, indicating that the measurement reference signal is transmitted on Re2 time-domain units. Measurement reference signals transmitted on the different time-domain units may be the same. Transmission resources corresponding to the measurement reference signals on the different time-domain units may be the same.

An embodiment provides a method for transporting common control information. The method includes:

determining a transmission manner of the common control information according to a type of the common control information, or determining the transmission manner of the common control information according to a relationship between the total number of time-domain symbols required by the common control information and a predetermined threshold. The common control information includes at least one of the following: a common message and a common control signaling for indicating configuration information about the common message.

The method in this embodiment may further include: transmitting the common control information according to the determined transmission manner.

Optionally, the type of the common control information includes: a paging message, a system message, an RAR, and a Transmission Control Protocol (TPC).

Alternatively, the type of the common control information indicates that the common control information is transmitted in a fixed manner or transmitted as needed.

Alternatively, the type of the common control information indicates whether the length of the common control information is a variable or fixed.

Alternatively, the type of the common control information indicates whether the common control information is transmitted in real time or transmitted with a delay.

Alternatively, the type of the common control information indicates whether the length of the common control information is greater than a predetermined threshold or less than the predetermined threshold.

Optionally, the common control information is transmitted through different transmission manners.

Optionally, the common control signaling is used to indicate transmission of the common message or only the common message is transmitted.

Optionally, the common control signaling and the common message are time-division multiplexed or a time-domain symbol set occupied by the common control signaling is a subset of a time-domain symbol set occupied by the common message.

Optionally, the common control signaling and a private control signaling are time-division multiplexed or the common control signaling and the private control signaling are frequency-division multiplexed.

Optionally, the common message and service data are time-division multiplexed or the common message and the service data are frequency-division multiplexed.

The service data is data information other than the common message.

Optionally, the transmission manner of the common control information is determined according to the total number of time-domain symbols required by the common control information and the predetermined threshold as follows:

when the total number of time-domain symbols required by the common control information is less than the predetermined threshold, a third transmission manner is used; and when the total number of time-domain symbols required by the common control information is greater than the predetermined threshold, a fourth transmission manner is used.

The third transmission manner satisfies at least one of the following: the common control signaling is used to indicate transmission of the common message; the common control signaling and a private control signaling are frequency-division multiplexed; and the common message and service data are frequency-division multiplexed.

The fourth transmission manner satisfies at least one of the following: only the common message is transmitted; transmission parameters of the common message belong to a preset set; and the common message does not have a corresponding common control signaling.

Optionally, the predetermined threshold is a fixed value.

Optionally, the predetermined threshold is obtained according to the total number of time-domain symbols included in a downlink control domain in a current time unit.

Optionally, the predetermined threshold is obtained according to a system message.

Optionally, the predetermined threshold is obtained according to the total number of time-domain symbols included in a downlink control domain detected by a receiving end corresponding to the common control information.

In an embodiment, the two types of common control information are transmitted in the following manner:

the two types of common control information may be transmitted on the same time-domain resource in a frequency-division multiplexing mode; and a third type of common control information indicates frequency-domain resources occupied by a fourth type of common control information.

Optionally, the channel coding rate of the fourth type of common control information is determined according to whether the third type of common control information is transmitted.

Optionally, on the time-domain resource, the third type of common control information is transmitted as needed, and the fourth type of common control information is transmitted in a fixed manner.

Optionally, the fourth type of common control information is at least one of system broadcast information and a system message, and the third type of common control information is at least one of a paging message and indication information for transmitting configuration information about the paging message.

Optionally, time-frequency resources occupied by the third type of common control information are fixed.

Optionally, the first channel coding rate of the fourth type of common control information is less than the second channel coding rate of the fourth type of common control information.

When the third type of common control information corresponding to the first channel coding rate is not transmitted, the channel coding rate corresponding to the fourth type of common control information. When the third type of common control information corresponding to the first channel coding rate is transmitted, the channel coding rate corresponding to the fourth type of common control information.

Figure 2:
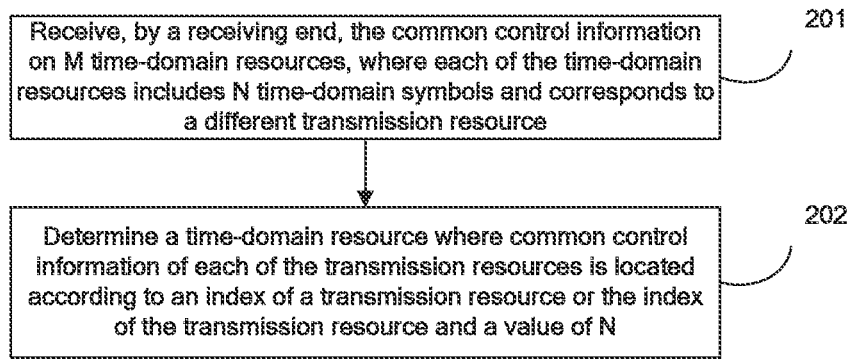
FIG. 2 is flowchart two of a method for transporting common control information according to an embodiment of the present disclosure.

An embodiment provides a method for transporting common control information. The method is applicable to a terminal. The terminal can transmit data to a device that performs the method of FIG. 1. As shown in FIG. 2, the method in this embodiment includes the steps described below.

In step 201, a receiving end receives the common control information on M time-domain resources, where each of the time-domain resources includes N time-domain symbols and corresponds to a different transmission resource.

In step 202, the time-domain resource where the common control information of each of the transmission resources is located is determined according to a resource index of the transmission resource or determined according to the resource index of the transmission resource and a value of N, where M and N are positive integers.

Optionally, the transmission resources include at least one of the following: a transmission beam resource, a transmission antenna resource, a transmission port resource, a transmission frequency-domain resource, a transmission sequence resource and a transmission time-domain resource.

Optionally, the value of N belongs to a set having at least two positive integers.

For each value of N in the set, the time-domain resource where each of the transmission resources is located is obtained according to the transmission resource index and the value of N, and the common control information is detected in the time-domain resource.

Optionally, before the common control information is received, the method further includes:

determining, by the receiving end, the transmission resource index of the transmission resource where the receiving end is located, and detecting only the common control information in the time-domain resource, which corresponds to the transmission resource where the receiving end is located, among the M time-domain resources.

Optionally, the receiving end determines the transmission resource where the receiving end is located according to at least one of a synchronization signal, a broadcast channel signal and a measurement reference signal.

The receiving end determines, according to the total number of receiving manners used to receive the common control information, a time-frequency resource on which the receiving end detects the common control information.

Optionally, the common control information includes at least one of the following: a common message, and a common control signaling for indicating configuration information about the common message.

The common message includes at least one of the following: broadcast information, a system message, Random Access Response (RAR) information, Transmission Power Control (TPC) information and a paging message. The common control message includes at least one of the system message, the paging message, the Random Access Response (RAR) message and a Radio Resource Management (RRC) message. The common message may also be the system message or the common control message.

Optionally, one time-domain symbol may include the common control signaling and the common message.

Optionally, an intersection exists between a demodulation reference signal resource of the common control signaling and a demodulation reference signal resource of the common message.

Optionally, the common control signaling is located in an intermediate frequency-domain position of the time-domain symbol.

Optionally, a difference between the total number of subcarriers on one side of the common control signaling and the total number of subcarriers on the other side of the common control signaling is less than a predetermined threshold.

Optionally, the N time-domain symbols have Y types of subcarrier spacing, and Y is an integer greater than 1.

Optionally, subcarrier spacing of time-domain symbols where the common control signaling is located is greater than subcarrier spacing of time-domain symbols where the common message is located.

Optionally, the value of the Y is 2.

Optionally, the time-domain symbols having greater subcarrier spacing are ahead of the time-domain symbols having less subcarrier spacing.

Optionally, the common control information and at least one of the following signals are frequency-division multiplexed: a synchronization signal, a broadcast channel and a measurement reference signal.

Optionally, N time-domain symbols included in one time-domain resource are divided into [N/T] subunits, and the subunits are equally spaced, where T denotes a maximum number of time-domain symbols included in one subunit, / denotes a division operator, and [ ] denotes a rounding operator.

Optionally, M*N time-domain symbols included in the M time-domain resources are divided into [(M*N)/T1] subunits, and the subunits are equally spaced, where T1 denotes a maximum number of time-domain symbols included in one subunit, and * denotes a multiplication operator.

Optionally, the M*N time-domain symbols are distributed over one or more subframes, and the M*N time-domain symbols occupy part of symbols of each subframe.

T and T1 are integers greater than or equal to 1.

Optionally, the value of N is obtained according to at least one of the following information: a system bandwidth, subcarrier spacing, the total number of subcarriers included in one symbol, a length of the common control information, and a maximum number of receiving manners of a receiving end corresponding to the common control information.

Optionally, the value of N belongs to a set having at least two positive integers.

The set is preset, or is obtained from a broadcast message, or is obtained according to a system bandwidth. The value of N can also be obtained according to the system bandwidth.

Optionally, the method further includes: receiving the value of N transmitted from a transmitting end.

The receiving the value of N transmitted from the transmitting end may include:

receiving the value of N transmitted from the transmitting end through the common control information.

Optionally, in one time-domain resource set, a coding rate of the common control information is fixed.

Optionally, the total number of aggregation degrees corresponding to one common control information in one time-domain resource is 1.

Optionally, the total number of candidate control channel resources included in one search space per aggregation degree is 1.

Optionally, the common control information is detected on a fixed time-frequency resource.

When the common control information includes the common message, the method may further include:
determining a length set of the common message and detecting the common message with each value in the length set used as the length of the common message.

Optionally, the method further includes: determining the length set of the common message according to the value of N.

Optionally, the common control information is detected in a detection space, and the common message is obtained according to unit index information included in a data unit and a total number of data units.

Optionally, the common control information is detected in a first detection space, and if it is indicated by a unit being detected that a next unit exists, the next unit is detected in the first detection space or the next unit is detected in a second detection space, where the second detection space is preset or is indicated by the common control signaling in a current unit; and if it is indicated by a unit being detected that no next unit exists, detection is terminated.

Optionally, the M1 time-domain resources among the M time-domain resources are located at the beginning of the downlink transmission domain or part of time-domain symbols in the M1 time-domain resources are located at the beginning of the downlink transmission domain, M2 time-domain resources among the M time-domain resources are at an end of the downlink transmission domain, the M1 time-domain resources and the M2 time-domain resources are separated by x time-domain symbols, and x is an integer greater than 0, where M1+M2=M or M1+M2<M, and M1 and M2 are integers.

Optionally, the common control signaling is detected in initial M1 time-domain resources, and the common message is detected according to information, which is indicated by the common control signaling, about the time-domain resource occupied by the common message.

Optionally, for each transmission resource in the set of M2 transmission resources, the common message is detected on M1 time-domain resources in the M2 time-domain resources.

Optionally, for each transmission resource in the set of M2 transmission resources, the common message is detected on one time-domain resource in the M2 time-domain resources.

Optionally, the common control signaling is first detected in each time-domain resource of the M2 time-domain resources at the end of the downlink transmission domain, and the common message is detected in the time-domain resources according to the common control signaling.

Optionally, the M time-domain resources are located at the end of the downlink transmission domain.

Optionally, a one-to-one correspondence exists between the M transmission resources and M synchronization signals;
a one-to-one correspondence exists between the M transmission resources and M time-domain resources of a broadcast channel;
a one-to-one correspondence exists between the M transmission resources and M time-domain resources of a measurement reference signal, where one time-domain resource of the measurement reference signal includes at least one measurement reference signal port; or
each time-domain synchronization signal corresponds to one or more of the M transmission resources.

Optionally, the correspondence may be a quasi-co-location relationship. For example, a correspondence between a transmission resource and a synchronization signal indicates that a quasi-co-location relationship exists between the transmission resource and the synchronization signal or indicates that the demodulation reference signal of the common control information transmitted by using the transmission resource and the synchronization signal satisfy the quasi-co-location relationship. The quasi-co-location relationship between two signals indicates that the channel large-scale information of the first signal can be deduced from the channel large-scale information or channel characteristic parameters of the second signal.

The channel large-scale information or channel characteristic parameters include at least one of the following information: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, and central horizontal angle of arrival.

Optionally, the correspondence may also be related to a spatial parameter (Rx Spatial Parameter). The Rx Spatial Parameter includes at least one of the following parameters: AoA, Dominant AoA, average AoA, Power Angular Spectrum (PAS) of AoA, average AoD, PAS of AoD, transmit/receive channel correlation, transmit/receive beamforming, and spatial channel correlation.

Optionally, the correspondence may also be related to a transmission beam or a transmit spatial filter. For example, a correspondence between a transmit resource and a synchronization signal indicates that the transmission beam or the transmit spatial filter of the transmit resource is the same as or similar to the transmission beam or the transmit spatial filter of the synchronization signal or indicates that the transmission beam or the transmit spatial filter of the demodulation reference signal of the common control message transmitted using this transmission resource is the same as or similar to the transmission beam or the transmit spatial filter of the synchronization signal.

One synchronization signal may be one SS block. The synchronization signal in one cell is transmitted through one or more SS blocks.

Optionally, in one time-domain resource set, a coding rate of the common control information is fixed.

Optionally, the total number of aggregation degrees corresponding to one common control information in one time-domain resource is 1.

Optionally, the total number of candidate control channel resources included in one search space per aggregation degree is 1.

Optionally, the length of the common control information is fixed.

Optionally, time-frequency resources occupied by the common control information are fixed.

Optionally, an aggregation degree corresponding to one common control information in one time-domain resource and the total number of candidate control channel resources included in one search space per aggregation degree are determined by at least one of the following manners:

a manner of being notified by first-level common control information;

a manner of being determined by a system bandwidth;

a manner of being determined by the total number of demodulation reference signal ports corresponding to the one time-domain resource;

learning, from the control information, the aggregation degree and the total number of the candidate control channels per aggregation degree; and blindly detecting the common control information according to the aggregation degree and the total number of the candidate control channels per aggregation degree.

Optionally, a detection manner of the common control information is determined according to a type of the common control information, or the detection manner of the common control information is determined according to a relationship between the total number of time-domain symbols required by the common control information and a predetermined threshold.

The common control information includes at least one of the following: a common message and a common control signaling for indicating configuration information about the common message.

Optionally, the common control signaling is used to indicate detection of the common message or only the common message is detected.

Optionally, the common control signaling and the common message are time-division multiplexed or a time-domain symbol set occupied by the common control signaling is a subset of a time-domain symbol set occupied by the common message.

Optionally, the common control signaling and a private control signaling are time-division multiplexed or the common control signaling and the private control signaling are frequency-division multiplexed.

Optionally, the common message and service data are time-division multiplexed or the common message and the service data are frequency-division multiplexed, where the service data is data information other than the common message.

Optionally, the determining the detection manner of the common control information according to the total number of time-domain symbols required by the common control information and the predetermined threshold includes:

when the total number of time-domain symbols required by the common control information is less than the predetermined threshold, a third detection manner is used; and when the total number of time-domain symbols required by the common control information is greater than the predetermined threshold, a fourth detection manner is used.

The third detection manner satisfies at least one of the following: the common control signaling is used to indicate detection of the common message; the common control signaling and the private control signaling are frequency-division multiplexed; and the common message and service data are frequency-division multiplexed.

The fourth detection manner satisfies at least one of the following: only the common message is detected; transmission parameters of the common message belong to a preset set; and the common message does not have a corresponding common control signaling.

Optionally, the predetermined threshold is a fixed value.

Optionally, the predetermined threshold is obtained according to the total number of time-domain symbols included in a downlink control domain in a current time unit.

Optionally, the predetermined threshold is obtained according to a system message.

Optionally, the predetermined threshold is obtained according to the total number of time-domain symbols included in a downlink control domain detected by a receiving end corresponding to the common control information.

An embodiment provides a method for transporting common control information. The method includes: transmitting, by a transmitting end, the common control information on M time-domain resources, where M is a positive integer.

One time-domain resource may include common control information and at least one of the following: indication information indicating configuration information about a paging message, a demodulation reference signal, and a measurement reference signal.

Optionally, in one time-domain resource, the measurement reference signal and the common control information are transmitted in time division mode.

Optionally, a receiving end determines the time for detecting the common control information according to the total number of receiving manners of the receiving end.

Optionally, the receiving end determines the wake-up time according to the total number of receiving manners of the receiving end.

Optionally, the receiving end determines the time for starting beam training according to the total number of receiving manners of the receiving end.

Optionally, in one time-domain resource, the measurement reference signal is transmitted before transmitting the common control information.

Optionally, in one time-division resource, the total number of repeated transmissions of the measurement reference signal is greater than or equal to the total number of repeated transmissions of the common control information.

Optionally, the total number of repeated transmissions of the common control information is 1.

Optionally, the total number of repeated transmissions of one measurement reference signal belongs to a set pre-agreed with the receiving end.

Optionally, when the measurement reference signal is repeatedly transmitted, M transmission resources are first sequentially transmitted and then the M transmission resources are sequentially transmitted such that the M transmission resources are repeatedly transmitted.

Optionally, when the common message is a paging message, the M time-domain resources constitute one paging opportunity.

Optionally, the total number of repeated transmissions of at least one of the measurement reference signal and the common control information in the one of the M time-domain resources is $x2*R$, where x2 is an integer greater than 0, R is a maximum number of receiving manners of all receiving ends corresponding to the paging opportunity, or R is a maximum number of receiving manners of all receiving ends included in a currently transmitted paging message in the paging opportunity.

Optionally, in the one paging message transmission opportunity, paging messages of all receiving ends are allowed to be transmitted.

All receiving ends corresponding to one paging opportunity are composed of receiving ends allowed to be paged in the paging opportunity, and the receiving manners of the receiving ends included in the currently transmitted paging message in the paging opportunity are composed of all receiving ends paged in the currently transmitted paging message.

An embodiment provides an apparatus for performing the preceding method. For those not detailed in the apparatus embodiment, see the preceding method embodiment.

Figure 3:
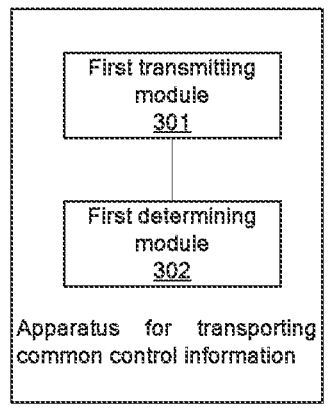
FIG. 3 is structure diagram one of an apparatus for transporting common control information according to an embodiment of the present disclosure.

An embodiment provides an apparatus for implementing the preceding method. As shown in FIG. 3, the apparatus includes: a first transmitting module 301 and a first determining module 302.

The first transmitting module 301 is configured to transmit common control information on M time-domain resources through M transmission resources, where each of the time-domain resources includes N time-domain symbols.

The first determining module 302 is configured to determine the time-domain resource where common control information of each of the transmission resources is located according to a resource index of the transmission resource or according to the resource index of the transmission resource and a value of N, where M and N are positive integers.

In an embodiment, the common control information includes at least one of the following information: a common message; and a common control signaling for indicating configuration information about the common message.

Optionally, the common message includes at least one of the following: broadcast information, a system message, Random Access Response (RAR) information, Transmission Power Control (TPC) information and a paging message. Optionally, the common control information includes at least one of the following: the system message, the paging message, the Random Access Response (RAR) message and a Radio Resource Management (RRC) message. The common message may also be the system message or the common control message.

Optionally, the common control signaling is transmitted on first Z time-domain symbols of the N time-domain symbols, where Z is an integer greater than or equal to 1.

Optionally, the common message and the common control signaling are transmitted on the N symbols.

Optionally, the total number of repeated transmissions of the common control signaling is greater than or equal to the total number of repeated transmissions of the common message.

Optionally, one time-domain symbol may include the common control signaling and the common message.

Optionally, an intersection exists between a demodulation reference signal resource of the common control signaling and a demodulation reference signal resource of the common message.

Optionally, the common control signaling is located in an intermediate frequency-domain position of the time-domain symbol (that is, an intermediate position of a system bandwidth).

Optionally, a difference between the total number of subcarriers on one side of the common control signaling and the total number of subcarriers on the other side of the common control signaling is less than a predetermined threshold.

Optionally, the N time-domain symbols have Y types of subcarrier spacing, where Y is an integer greater than 1.

Optionally, when the common control information includes the common message, the first determining module 302 is further configured to determine a length of the common control information and transmit the common message based on the determined length.

The length of the common message belongs to a set pre-agreed by the transmitting end and a receiving end.

Optionally, the first determining module 302 is further configured to determine the length set of the common message according to the value of N.

Optionally, the first determining module 302 is further configured to determine the number L of units included in the common control information, and when L is greater than 1, set one sub-block of the common message and the common control signaling in each of the units. The common control information may include at least one of the following information: information indicating whether a current unit is a last unit, information indicating a unit index of the current unit, a total number of units, a time-frequency resource occupied by a next unit, and Modulation and Coding Scheme (MCS) information of the next unit.

Optionally, the common control information and at least one of the following signals are frequency-division multiplexed: a synchronization signal, a broadcast channel and a second-level measurement reference signal.

Optionally, the value of N is obtained according to at least one of the following information: a system bandwidth, subcarrier spacing, the number of subcarriers included in one symbol, a length of the common control information, and a maximum number of receiving manners of a receiving end corresponding to the common control information.

Optionally, the value of N belongs to a set having at least two positive integers.

The set is preset, or is obtained from a broadcast message, or is obtained according to a system bandwidth. The value of N can also be obtained according to the system bandwidth.

Optionally, the first transmitting module 301 is further configured to notify the value of N to a receiving end.

Optionally, the first transmitting module 301 is further configured to transmit the value of N to the receiving end through the common control information.

Figure 4:
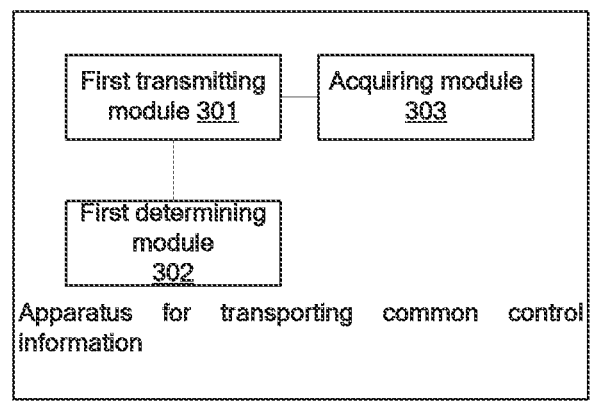
FIG. 4 is structure diagram two of an apparatus for transporting common control information according to an embodiment of the present disclosure.

Optionally, as shown in FIG. 4, the apparatus further includes: an acquiring module 303.

The acquiring module 303 is configured to obtain a minimum index symbol among N time-domain symbols corresponding to an ith transmission resource according to i*N, where $0 \leq i \leq M-1$; or obtain N time-domain symbols corresponding to the ith transmission resource according to (M*N+i), where $0 \leq i \leq M-1$, $0 \leq n \leq N-1$.

Optionally, M1 time-domain resources (any position before M2 symbols) among the M time-domain resources are located at the beginning of the downlink transmission domain or part of time-domain symbols in the M1 time-domain resources are located at the beginning of the downlink transmission domain, M2 time-domain resources among the M time-domain resources are at an end of the downlink transmission domain, the M1 time-domain resources and the M2 time-domain resources are separated by x time-domain symbols, and x is an integer greater than 0, where M1+M2=M or M1+M2<M, and M1 and M2 are integers.

Optionally, resources in a beginning position part of the downlink transmission domain among the M1 time-domain resources include common control signaling, and the common control signaling in each time-domain resource indicates a time-frequency resource occupied by a common message in the time-domain resource, where the time-frequency resource occupied by the common message is a resource in the x time-domain symbols, or the time-frequency resource occupied by the common message is a resource in the x time-domain symbols and in the time-domain resources in the beginning position part of the downlink transmission domain.

Optionally, a demodulation reference signal port in the M2 time-domain resources carries transmission resource index information.

Optionally, a demodulation reference signal port in the M1 time-domain resources does not carry transmission resource index information.

Optionally, for each transmission resource, the total number of time-domain resources on which transmission is allowed among the M2 time-domain resources is M1.

Optionally, one transmission resource is used to perform transmission on one of the M time-domain resources.

Optionally, the M time-domain resources are located at the end of the downlink transmission domain.

Optionally, a one-to-one correspondence exists between the M transmission resources and M synchronization signals;
- a one-to-one correspondence exists between the M transmission resources and M time-domain resources of a broadcast channel;
- a one-to-one correspondence exists between the M transmission resources and M time-domain resources of a measurement reference signal, where one time-domain resource of the measurement reference signal includes at least one measurement reference signal port; or
- each time-domain synchronization signal corresponds to one or more of the M transmission resources.

Optionally, the correspondence may be a quasi-co-location relationship. For example, a correspondence between a transmission resource and a synchronization signal indicates that a quasi-co-location relationship exists between the transmission resource and the synchronization signal or indicates that the demodulation reference signal of the common control information transmitted by using the transmission resource and the synchronization signal satisfy the quasi-co-location relationship. The quasi-co-location relationship between two signals indicates that the channel large-scale information of the first signal can be deduced from the channel large-scale information or channel characteristic parameters of the second signal.

The channel large-scale information or channel characteristic parameters include at least one of the following information: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, and central horizontal angle of arrival.

Optionally, the correspondence may also be related to a receiving spatial parameter (Rx Spatial Parameter). The Rx Spatial Parameter includes at least one of the following parameters: AoA, Dominant AoA, average AoA, Power Angular Spectrum (PAS) of AoA, average AoD, PAS of AoD, transmit/receive channel correlation, transmit/receive beamforming, and spatial channel correlation.

Optionally, the correspondence may also be related to a transmission beam or a transmit spatial filter. For example, a correspondence between a transmit resource and a synchronization signal indicates that the transmission beam or the transmit spatial filter of the transmit resource is the same as or similar to the transmission beam or the transmit spatial filter of the synchronization signal or indicates that the transmission beam or the transmit spatial filter of the demodulation reference signal of the common control message transmitted using this transmission resource is the same as or similar to the transmission beam or the transmit spatial filter of the synchronization signal.

One synchronization signal may be one SS block. The synchronization signal of one cell is transmitted through one or more SS blocks.

Optionally, the transmission resources are distinguished from each other by at least one of the following resource types: a transmission beam resource, a transmission antenna resource, a transmission port resource, a transmission frequency-domain resource, a transmission sequence resource and a transmission time-domain resource.

Optionally, in one time-domain resource set, a coding rate of the common control information is fixed.

Optionally, the total number of aggregation degrees corresponding to one common control information in one time-domain resource is 1.

Optionally, the total number of candidate control channel resources included in one search space per aggregation degree is 1.

Optionally, at least one of an aggregation degree corresponding to one common control information in one time-domain resource and the total number of candidate control channel resources included in one search space per aggregation degree is determined by at least one of the following manners:
- a manner of being notified by first-level common control information;
- a manner of being determined by a system bandwidth;
- a manner of being determined by the total number of demodulation reference signal ports corresponding to one time-domain resource; and
- notifying the aggregation degree and the total number of the candidate control channels per aggregation degree.

Optionally, each T first time units have one time-domain resource set, and the time-domain resource set is composed of the M time-domain resources, where T is an integer multiple of a transmission period of a first common signal, and the first common signal may include at least one of the following signals: a synchronization signal, a broadcast signal and a measurement reference signal.

Optionally, the first time unit is a radio frame.

An embodiment provides an apparatus for transporting common control information. The apparatus includes: a second transmitting module.

The second transmitting module is configured to transmit the common control information on M time-domain resources, where M is a positive integer.

One time-domain resource may include common control information and at least one of the following: indication information indicating configuration information about a paging message, a demodulation reference signal, and a measurement reference signal.

Optionally, in one time-domain resource, the measurement reference signal and the common control information are transmitted in time division mode.

Optionally, in one time-domain resource, the measurement reference signal is transmitted before transmitting the common control information.

Optionally, in one time-division resource, the total number of repeated transmissions of the measurement reference signal is greater than or equal to the total number of repeated transmissions of the common control information.

Optionally, when the common message is a paging message, the M time-domain resources constitute one paging opportunity.

Optionally, the total number of repeated transmissions of at least one of the measurement reference signal and the common control information in the one of the M time-domain resources is x2*R, where x2 is an integer greater than 0, R is a maximum number of receiving manners of all receiving ends corresponding to the paging opportunity, or R is a maximum number of receiving manners of all receiving ends included in a currently transmitted paging message in the paging opportunity.

Optionally, in the one paging message transmission opportunity, paging messages of all receiving ends are allowed to be transmitted.

All receiving ends corresponding to one paging opportunity are composed of receiving ends allowed to be paged in the paging opportunity, and the receiving manners of all receiving ends included in the currently transmitted paging message in the paging opportunity are composed of all receiving ends paged in the currently transmitted paging message.

In the preceding solution, the total number of repeated transmissions of one information is Re1, indicating that one information is transmitted on Re1 time-domain units, where corresponding information on different time-domain units is independently coded, or corresponding information before channel coding on the different time-domain units is the same.

The information is the common message, or is a common control signaling for indicating configuration information about the common message.

The total number of repeated transmissions of one measurement reference signal is Re2, indicating that the measurement reference signal is transmitted on Re2 time-domain units. Measurement reference signals transmitted on the different time-domain units are the same. Optionally, transmission resources corresponding to the measurement reference signals on the different time-domain units are the same.

Figure 5:
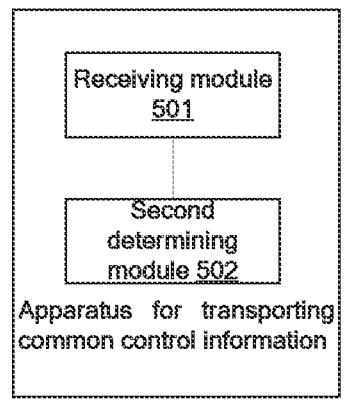
FIG. 5 is structure diagram three of an apparatus for transporting common control information according to an embodiment of the present disclosure.

An embodiment provides an apparatus for transporting common control information. As shown in FIG. 5, the apparatus includes: a receiving module 501 and a second determining module 502.

The receiving module 501 is configured to receive the common control information on M time-domain resources, where each of the time-domain resources includes N time-domain symbols, and each of the time-domain resources corresponds to a different transmission resource.

The second determining module 502 is configured to determine the time-domain resource where the common control information of each of the transmission resources is located according to a resource index of the transmission resource or according to the resource index of the transmission resource and a value of N, where M and N are positive integers.

Optionally, the transmission resources include at least one of the following: a transmission beam resource, a transmission antenna resource, a transmission port resource, a transmission frequency-domain resource, a transmission sequence resource and a transmission time-domain resource.

Optionally, the value of N belongs to a set having at least two positive integers.

Optionally, for each value of N in the set, the time-domain resource where each of the transmission resources is located is obtained according to the transmission resource index and the value of N, and the common control information is detected in the time-domain resource.

Optionally, the receiving module 501 is configured to determine, before receiving the common control information, a resource index of the transmission resource where a receiving end is located, and, among the M time-domain resources, detect only common control information in the time-domain resource corresponding to the transmission resource where the receiving end is located.

Optionally, the receiving module 501 is configured to determine the transmission resource where the receiving end is located according to at least one of a synchronization signal, a broadcast channel signal and a measurement reference signal.

Optionally, the receiving module is further configured to determine, according to the total number of receiving manners used by the receiving end to receive the common control information, a time-frequency resource on which the receiving end detects the common control information.

Optionally, the common control information includes at least one of the following: a common message; and a common control signaling for indicating configuration information about the common message.

Optionally, the common message includes at least one of the following: broadcast information, a system message, Random Access Response (RAR) information, Transmission Power Control (TPC) information and a paging message. Optionally, the common control message includes at least one of the system message, the paging message, the Random Access Response (RAR) message and a Radio Resource Management (RRC) message. The common message may also be the system message or the common control message.

Optionally, when the common control information includes the common message, the second determining module 502 is further configured to determine a set to which a length of the common message belongs and detect the common message with each value in the set used as the length of the common message.

Optionally, the second determining module 502 is further configured to determine the length set of the common message according to the value of N.

Optionally, the receiving module 501 is further configured to receive the value of N transmitted from a transmitting end.

Optionally, the receiving module 501 is configured to receive the value of N transmitted from the transmitting end through the common control information.

Optionally, one time-domain symbol includes the common control signaling and the common message.

Optionally, an intersection exists between a demodulation reference signal resource of the common control signaling and a demodulation reference signal resource of the common message.

Optionally, the common control signaling is located in an intermediate frequency-domain position of the time-domain symbol.

Optionally, a difference between the total number of subcarriers on one side of the common control signaling and the total number of subcarriers on the other side of the common control signaling is less than a predetermined threshold.

Optionally, the N time-domain symbols have Y types of subcarrier spacing, and Y is an integer greater than 1.

Optionally, the value of N is obtained according to at least one of the following information: a system bandwidth, subcarrier spacing, the number of subcarriers included in one symbol, a length of the common control information, and a maximum number of receiving manners of a receiving end corresponding to the common control information.

Optionally, the value of N belongs to a set having at least two positive integers.

Optionally, in one time-domain resource set, a coding rate of the common control information is fixed.

Optionally, the total number of aggregation degrees corresponding to one common control information in one time-domain resource is 1.

Optionally, the total number of candidate control channel resources included in one search space per aggregation degree is 1.

Optionally, the common control information is detected on a fixed time-frequency resource.

Optionally, M1 time-domain resources among the M time-domain resources are located at the beginning of the downlink transmission domain or part of time-domain symbols in the M1 time-domain resources are located at the beginning of the downlink transmission domain, M2 time-domain resources among the M time-domain resources are at an end of the downlink transmission domain, the M1 time-domain resources and the M2 time-domain resources are separated by x time-domain symbols, and x is an integer greater than 0, where M1+M2=M or M1+M2<M, and M1 and M2 are integers.

Optionally, the common control signaling is detected in initial M1 time-domain resources, and the common message is detected according to information, which is indicated by the common control signaling, about the time-domain resource occupied by the common message.

Optionally, for each transmission resource in a set of M2 transmission resources, the common message is detected on M1 time-domain resources in the M2 time-domain resources.

Optionally, for each transmission resource in the set of M2 transmission resources, the common message is detected on one time-domain resource in the M2 time-domain resources.

Optionally, the common control signaling is first detected in each time-domain resource of the M2 time-domain resources at the end of the downlink transmission domain, and the common message is detected in the time-domain resources according to the common control signaling.

Optionally, the M time-domain resources are located at the end of the downlink transmission domain.

Optionally, a one-to-one correspondence exists between the M transmission resources and M synchronization signals.

Optionally, a one-to-one correspondence exists between the M transmission resources and M time-domain resources of a broadcast channel.

Optionally, a one-to-one correspondence exists between the M transmission resources and M time-domain resources of a measurement reference signal, where one time-domain resource of the measurement reference signal includes at least one measurement reference signal port.

Optionally, each time-domain synchronization signal corresponds to one or more of the M transmission resources.

Optionally, the correspondence may be a quasi-co-location relationship. For example, a correspondence between a transmission resource and a synchronization signal indicates that a quasi-co-location relationship exists between the transmission resource and the synchronization signal or indicates that the demodulation reference signal of the common control information transmitted by using the transmission resource and the synchronization signal satisfy the quasi-co-location relationship. The quasi-co-location relationship between two signals indicates that the channel large-scale information of the first signal can be deduced from the channel large-scale information or channel characteristic parameters of the second signal.

The channel large-scale information or channel characteristic parameters include at least one of the following information: delay spread, Doppler spread, Doppler shift, average delay, average gain, average vertical transmission angle, average horizontal transmission angle, average vertical angle of arrival, average horizontal angle of arrival, central vertical transmission angle, central horizontal transmission angle, central vertical angle of arrival, and central horizontal angle of arrival.

Optionally, the correspondence may also be related to a receiving spatial parameter (Rx Spatial Parameter). The Rx Spatial Parameter includes at least one of the following parameters: AoA, Dominant AoA, average AoA, Power Angular Spectrum (PAS) of AoA, average AoD, PAS of AoD, transmit/receive channel correlation, transmit/receive beamforming, and spatial channel correlation.

Optionally, the correspondence may also be related to a transmission beam or a transmit spatial filter. For example, a correspondence between a transmit resource and a synchronization signal indicates that the transmission beam or the transmit spatial filter of the transmit resource is the same as or similar to the transmission beam or the transmit spatial filter of the synchronization signal or indicates that the transmission beam or the transmit spatial filter of the demodulation reference signal of the common control message transmitted using this transmission resource is the same as or similar to the transmission beam or the transmit spatial filter of the synchronization signal.

One synchronization signal may be one SS block. The synchronization signal of one cell is transmitted through one or more SS blocks.

Optionally, the transmission resources include at least one of the following: a transmission beam resource, a transmission antenna resource, a transmission port resource, a transmission frequency-domain resource, a transmission sequence resource and a transmission time-domain resource.

Optionally, in one time-domain resource set, a coding rate of the common control information is fixed.

Optionally, the total number of aggregation degrees corresponding to one common control information in one time-domain resource is 1.

Optionally, the total number of candidate control channel resources included in one search space per aggregation degree is 1.

Optionally, a length of the common control information is fixed.

Optionally, time-frequency resources occupied by the common control information are fixed.

An embodiment provides an apparatus for transporting common control information. The apparatus includes a third determining module.

The third determining module is configured to determine a detection manner of the common control information according to a type of the common control information, or determine the detection manner of the common control information according to a relationship between the total number of time-domain symbols required by the common control information and a predetermined threshold.

The common control information includes at least one of the following: a common message and a common control signaling for indicating configuration information about the common message.

An embodiment provides a network node including the apparatus for transporting common control information as shown in FIGS. 3 and 4.

An embodiment further provides a terminal including the apparatus for transporting common control information as shown in FIG. 5.

One or more modules in the apparatus for transporting common control information in the preceding embodiments may be implemented by a processor in a network element where the apparatus for transmitting common control information is located or may be implemented by a logic circuit. For example, the preceding one or more modules may be implemented by a Central Processing Unit (CPU), a Micro-Controller Unit (MPU), a Digital Signal Processor (DSP) or a Field-Programmable Gate Array (FPGA) in the apparatus for transmitting common control information.

Embodiment One

In this embodiment, a base station transmits common control information on M time-domain resources through M transmission resources. Each of the time-domain resources includes N time-domain symbols. The time-domain resource where the common control information of each transmission resource is located is determined according to an index of the transmission resource and a value of N.

The transmission resources include one of more of the following: a transmission beam resource, a transmission antenna resource, a transmission port resource, a transmission frequency-domain resource, a transmission sequence resource and a transmission time-domain resource.

Figure 6A:
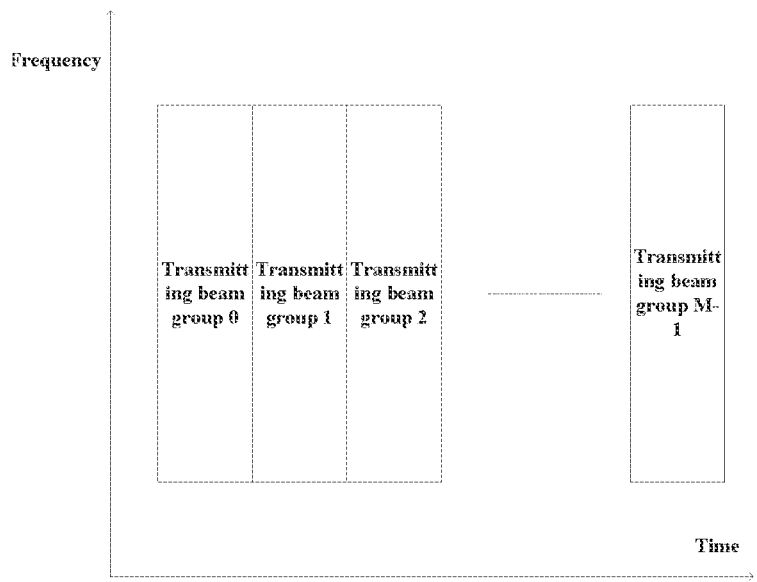
FIG. 6a illustrates a resources example of a set of M time-domain resource when the value of N is 1 according to an embodiment of the present disclosure.
Figure 6B:
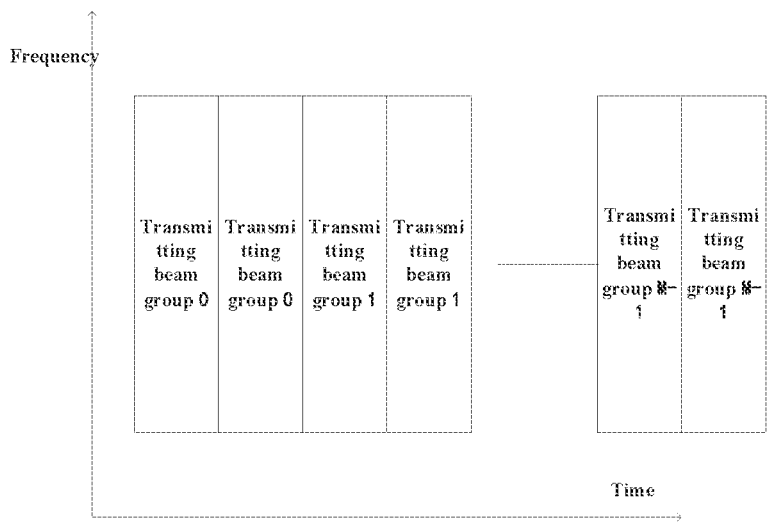
FIG. 6b illustrates a resources example of a set of M time-domain resource when the value of N is 2 according to an embodiment of the present disclosure.
Figure 6C:
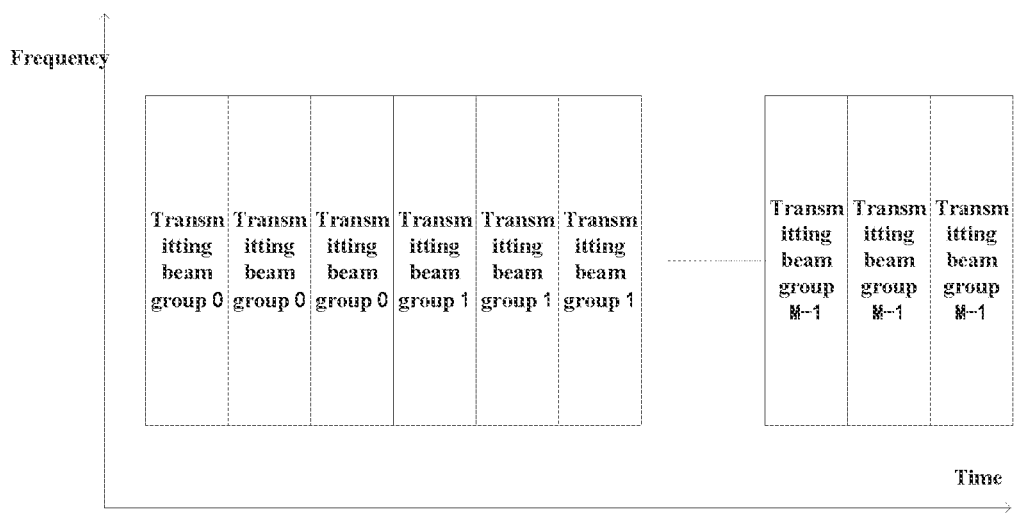
FIG. 6c illustrates a resources example of a set of M time-domain resource when the value of N is 3 according to an embodiment of the present disclosure.

As shown in FIGS. 6a to 6c, the time-domain symbol resources corresponding to the same transmission resources are different when the values of N are different. The initial time-domain symbol is assumed to be symbol 0. As shown in FIG. 6a, when the value of N is 1, the time-domain resource occupied by transmission resource 1 (that is, the transmission beam group 1 in the figure) is time-domain symbol 1. As shown in FIG. 6b, when the value of N is 2, the time-domain resource occupied by transmission resource 1 is time-domain symbols {2, 3}. As shown in FIG. 6c, when the value of N is 3, the time-domain resource occupied by transmission resource 1 is time-domain symbols {3, 4, 5}. The base station can determine the time-domain resource occupied by each transmission resource according to the index of the transmission resource and the value of N.

The value of N can be determined according to at least one of the following parameters: a system bandwidth, sub-carrier spacing, the total number of subcarriers included in one symbol, and the length of the common control information.

When the common control information includes a common message and a common control signaling indicating configuration information about the common message, the length of the common control information includes the length of the common message and the length of the common control signaling. The value of N may be carried in a broadcast message. The value of N may be carried in first-level common control information. Optionally, the value of N corresponding to the first-level common control information which notifies of the value of N is a fixed value, or the value of N corresponding to the system message which carries the value of N belongs to a set.

In the above manners of determining the value of N, in the first manner, one value of N is determined; in the second manner, a set B is determined in a set A to which the value of N belongs. The set A includes two positive integers and the set B is a subset of the set A. The set B includes one positive integer.

When it is determined that N has multiple values, the base station may determine the value of N according to at least one of the currently transmitted common control signaling and the length of the second type of common message indicated by the common control signaling. Optionally, the value of N is transmitted to a terminal, for example, by using a channel like a Physical Control Format Indicator Channel (PCFICH) in the LTE or by using the common control signaling. The terminal may determine multiple values of N by blindly detecting the common control signaling or the common message. For example, the terminal may blindly detect the transmission manner adopted by the base station in FIGS. 6a to 6c.

Figure 7:
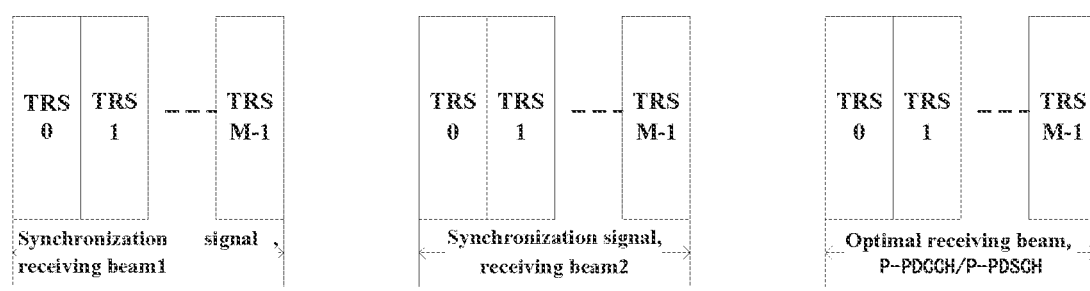
FIG. 7 is a schematic diagram illustrating a correspondence between M time-domain resources of a synchronization signal and M time-domain resources on which common control information is transmitted according to an embodiment of the present disclosure.

Optionally, as shown in FIG. 7, a one-to-one correspondence exists between the M transmission resources and the time-domain resources on which a synchronization signal is transmitted, and the terminal obtains its own optimal receiving manner and a downlink transmission resource set where the terminal is located through the synchronization signal. The downlink transmission resource set includes at least one transmission resource. The terminal obtains, according to the index of each transmission resource in the transmission resource set and the value of N, time-domain symbols on which the terminal detects the common message. As shown in FIG. 7, the terminal receives data in a selected receiving manner on C-PDCCH (that is, the common control signaling) and C-PDSCH (that is, the common message) time-domain resources. For example, if the set of transmission resources obtained by the terminal is {transmission resource 0, transmission resource 1} and the value of N determined by the terminal belongs to the set {1, 2, 3}, then, for the transmission resource 1, the terminal detects the common message on symbols {1}, {2, 3} and {3, 4, 5} in sequence and, for the transmission resource 0, the terminal detects the common control information on symbols {0}, {0, 1} and {0, 1, 2} in sequence. In FIG. 7, the value of N is not fixed and the value of N belongs to a set, so the terminal uses the same radio frequency receiving manner for different transmission resources on at least one of C-PDCCH and C-PDSCH time-domain resources. If the receiving manner is a base-band receiving manner, that is, different receiving manners correspond to the same radio-frequency beam, then the terminal can use the same radio-frequency beam to receive all transmission resources. For each assumed value of N, different transmission resources can be received in different receiving manners that are previously trained. Optionally, when N is a fixed value, the terminal receives different transmission resources in a specific receiving manner. For example, if transmission resource 0 corresponds to receiving manner 1 and transmission resource 1 corresponds to receiving manner 0 through the previous training of receiving manners, then, in the C-PDCCH and C-PDSCH, domain transmission resource 0 is received in receiving manner 1 and transmission resource 1 is received in receiving manner 0.

In FIG. 7, there are M time-domain resources for the synchronization signal, and one time-domain resource on which the synchronization signal is transmitted corresponds to one time-domain resource on which the common control information is transmitted (transmission resource is abbreviated as TRS in FIG. 7). Optionally, one time-domain resource on which the synchronization signal is transmitted corresponds to multiple time-domain resources on which the common control information is transmitted. Optionally, a one-to-one correspondence exists between the M transmission resources and the M time-domain resources of a broadcast channel; or a one-to-one correspondence exists between the M transmission resources and the M time-domain resources of a measurement reference signal. One time-domain resource of the measurement reference signal includes at least one measurement reference signal port.

Figure 8A:
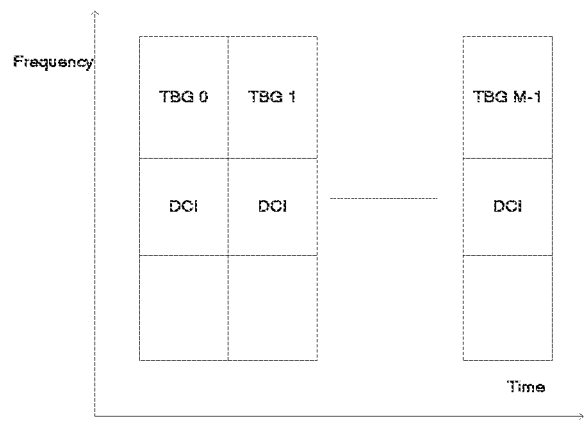
FIGS. 8a to 8c are schematic diagrams illustrating the position of common control signaling in each time-domain resource set according to an embodiment of the present disclosure.
Figure 8B:
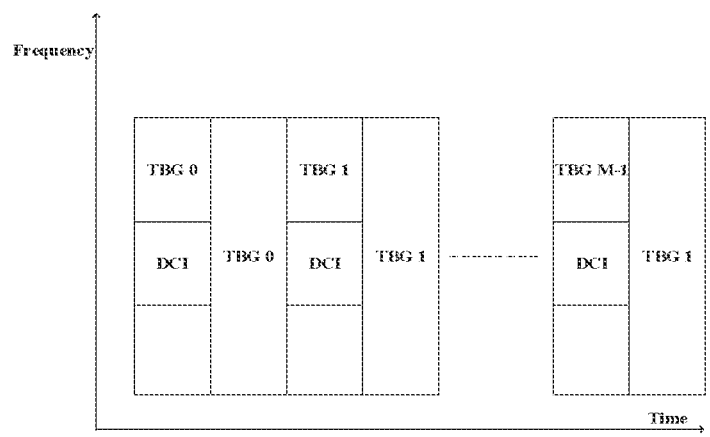
Figure 8C:
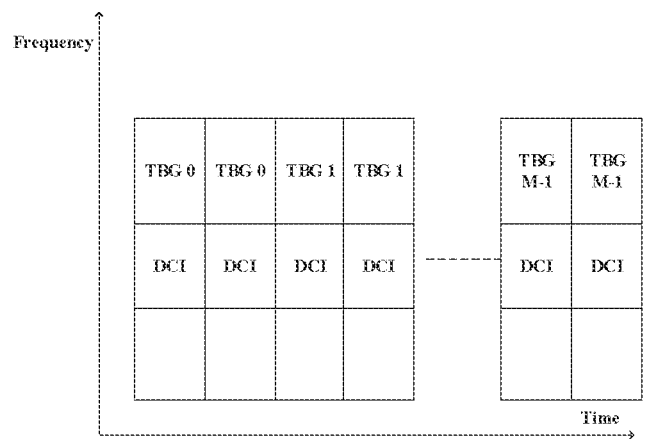

Optionally, in one time-domain resource, a first implementation is to only transmit the common message, and a second implementation is to transmit the common message and the common control signaling, where the common control signaling is used for indicating configuration information about the common message. In this case, the common control signaling and the common message are in multiplexing mode. In the first implementation, as shown in FIGS. 8a to 8b (transmission beam group is abbreviated as TBG in FIG. 8a-8c), the common control signaling is transmitted on a time-domain symbol having the smallest index among the N time-domain symbols. It is assumed in FIGS. 8a and 8b that the base station and the terminal agree that the value of N belongs to {1, 2}. The terminal can blindly detect whether FIG. 8a or FIG. 8b is used by the base station for transmission. In a determined time-domain resource, the terminal first detects DCI information (that is, the common control signaling) in the time-domain symbol having the smallest index. In the second implementation, the common control signaling can occupy resources in the N time-domain symbols, as shown in FIG. 8c, where the value of N is 2. In this case, the common control signaling in each transmission resource can occupy resources in two time-domain symbols. The DCI in the two symbols may be the same DCI that are repeatedly transmitted or may be different indication fields of the same DCI.

In an embodiment, the common message includes at least one of the following: a system message, a paging message, a random access response (RAR) message, a radio resource control (RRC) message and a Transmission Power Control (TPC) message. In this embodiment, the transmission beam group i is the transmission resource i, where the value of i is a value in the set {0, 1, . . . , M−1}.

Embodiment Two

In this embodiment, the common control information is transmitted on M time-domain resources through M transmission resources, where each of the time-domain resources includes N time-domain symbols. The common control information and a measurement reference signal are transmitted in the N time-domain symbols in one time-domain resource.

Figure 9A:
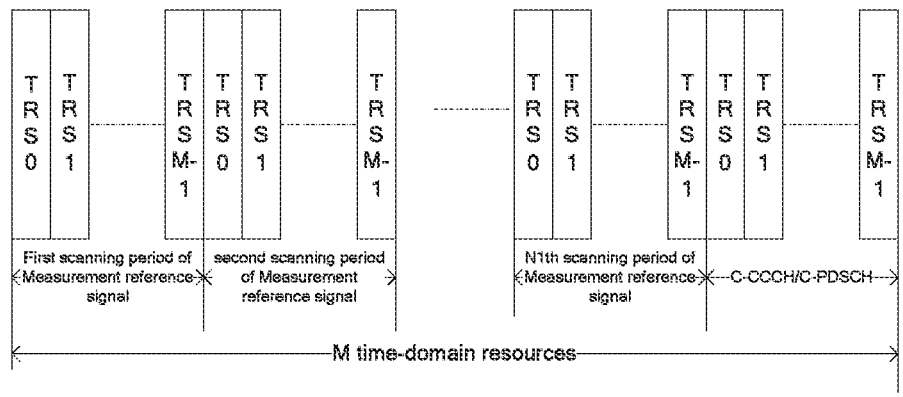
FIG. 9a is a schematic diagram in which when each time-domain resource includes a measurement reference signal and common control information, the measurement reference signal is transmitted before the common control information and the total number of repeated transmissions of the measurement reference signal is greater than the total number of repeated transmissions of the common control information according to an embodiment of the present disclosure.

The common control information and the measurement reference signal are transmitted in the N time-domain symbols in one time-domain resource as described below. In the first manner, the measurement reference signal and the common control information are in time-division multiplexing mode, and the measurement reference signal is transmitted before the common control information, or the total number of repeated transmissions of the measurement reference signal is greater than or equal to the total number of repeated transmissions of the common control information. For example, the total number of repeated transmissions of the measurement reference signal is R and the total number of repeated transmissions of the common control information is 1, that is, the receiving manner is first trained and the common control information is received in the optimal receiving manner. As shown in FIG. 9a, the measurement reference signal is transmitted before the common control information, and the common control information includes at least one of C-CCCH and C-PDSCH. The time-domain resource for transmission resource 0 is composed of R measurement reference signal resources for transmission resource 0 and common control information resources for transmission resource 0.

Figure 9B:
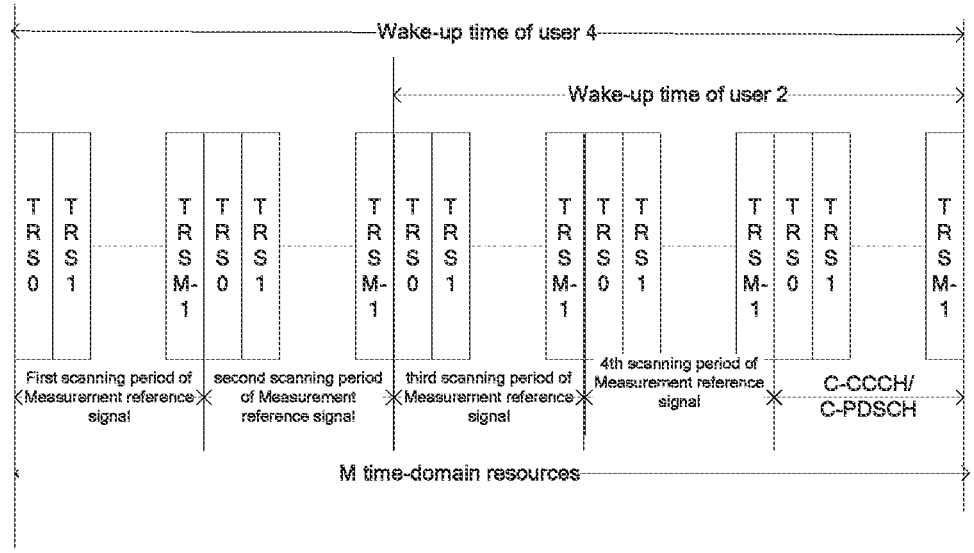
FIGS. 9b and 9c illustrate an example in which the total numbers of repeated transmissions of a measurement reference signal in different paging opportunities are different and a receiving end determines the wake-up time according to the total number of receiving manners according to an embodiment of the present disclosure.
Figure 9C:
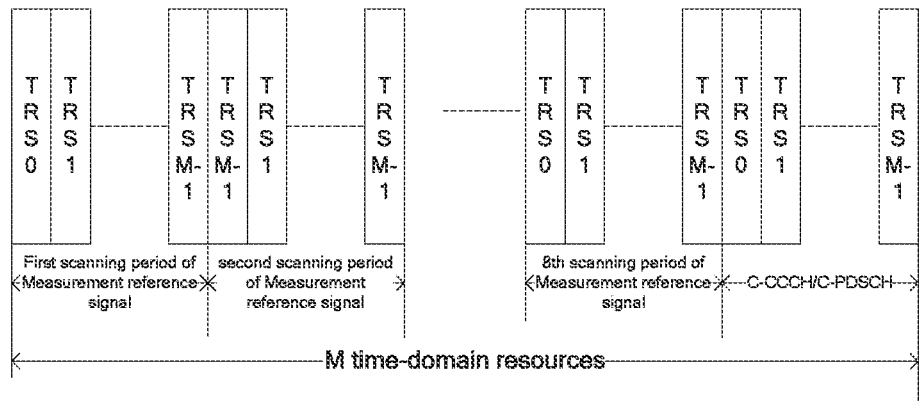

When the common control information is at least one of a paging message and a control signaling indicating configuration information about the paging message, the total number of repeated transmissions of the measurement reference signal may be different in different paging opportunities. That is, in one time-domain resource, the total number of repeated transmissions of the measurement reference signal may be the maximum number of receiving manners corresponding to all users to which paging can be transmitted in the paging opportunity or may be the maximum number of receiving manners corresponding to all users included in the currently transmitted paging message in the paging opportunity. The paging opportunity has the M time-domain resources. As shown in FIGS. 9b and 9c, the total number of repeated transmissions of the measurement reference signal in the first paging opportunity of a base station is 4. As shown in FIG. 9b, the total number of repeated transmissions of the measurement reference signal in the second paging opportunity of the base station is 8. As shown in FIG. 9c, the paging opportunity of the user group 1 may be transmitted in the first paging opportunity, and the paging opportunity of the user group 2 may be transmitted in the second paging opportunity.

The total number of repeated transmissions of the measurement reference signal in each paging opportunity may be determined according to the maximum number of receiving manners among the users that can be paged in the paging opportunity. For example, the paging message of the user group 1 may be transmitted in the first paging opportunity, and the user group 1 includes {user 1, user 2, user 3, . . . , user 10}. The 10 users have different user IDs. The total number of receiving manners corresponding to these 10 users is {(user 1, 1 receiving manner), (user 2, 2 receiving manners), (user 3, 4 receiving manners), . . . , (user 10, 1 receiving manner)}. Assuming that the maximum number of receiving manners of the 10 users is 4, in this solution, if the users do not change in the next paging opportunity, in one paging opportunity corresponding to one user group, transmission beams transmitted at different times have the same number of repetitions.

The second solution of the total number of repeated transmissions of the measurement reference signal in each paging opportunity is determined according to the maximum number of receiving manners of the currently paged users. For example, in the first paging opportunity as described above, the user group 1 can be paged. The user group 1 includes {user 1, user 2, user 3, . . . , user 10}. The currently paged are user 1 and user 2. The total number of receiving manners of user 1 and user 2 is (user 1, 1 receiving manner), (user 2, 2 receiving manners). In this case, in this paging opportunity, the total number of repeated transmissions of the measurement reference signal is the maximum number of receiving manners of user 1 and user 2, and the total number of repeated transmissions of the measurement reference signal is 2. In the preceding solution, a terminal feeds back the user receiving manner capability (for example, the total number of receiving manners) to the base station.

In the preceding solution of transmitting the measurement reference signal, different transmission resources are polled, and then the transmission resources are repeatedly transmitted. The solution is compatible with terminals having different receiving manners.

As shown in FIG. 9b, if user 2 has two receiving manners, user 2 can be woken up in two scanning periods of the measurement reference signal before the common control information; if user 4 has four receiving manners, user 4 can be woken up in four scanning periods of the measurement reference signal before the common control information. In the preceding implementation, a demodulation reference signal may not be transmitted while the common control information is transmitted, and the measurement reference signal may serve as the demodulation reference signal. For example, in FIGS. 9a to 9c, the C-CCCH/C-PDSCH domain does not include the demodulation reference signal, the terminal acquires the optimal transmission resource (abbreviated as TRS in FIGS. 9a to 9c) and receiving manner in the measurement reference signal domain, and the measurement reference signal corresponding to the optimal transmission resource and receiving manner may serve as the demodulation reference signal of the transmission resource and receiving manner corresponding to the common control information domain.

As shown in FIG. 9a, if user 2 obtains transmission resource 0 and receiving manner 1 in the 8th scanning period of the measurement reference signal described in the figure, then the demodulation reference signal of transmission resource 0 of user 2 in the C-CCCH/C-PDSCH domain may be the measurement reference signal resource of transmission resource 0 in the 8th scanning period. The measurement reference signal may be used as the demodulation reference signal if at least one of the following conditions is satisfied: the interval between the measurement reference signal resource and the common control information resource is small, and the total number of time domain resources required by one beam scanning is small. If the preceding condition is not satisfied, the measurement reference signal is not used as the demodulation reference signal, or the use of the measurement reference signal as the demodulation reference signal needs to be indicated by signaling. In one time-domain symbol, the signaling may be transmitted before the M time-domain resources.

The common control information and the measurement reference signal are transmitted in N time-domain symbols in one time-domain resource as described below. In a second manner, the measurement reference signal and the common control information are in frequency-division multiplexing mode, and the measurement reference signal and the common control information are repeatedly transmitted. Optionally, the measurement reference signal is used a demodulation reference signal.

Optionally, when the common control information includes at least one of a paging message and a control signaling indicating configuration information about the paging message, for the total number of repeated transmissions of the measurement reference signal and the common control information, reference can be made to the total number of repeated transmissions of the measurement reference signal and the common control information described above. The total number of repeated transmissions may be the maximum number of receiving manners of all users that can transmit paging message in the paging opportunity or may be the maximum number of receiving manners of all users involved in the currently transmitted paging message in the paging opportunity.

When terminals corresponding to different information in the common control information have different numbers of receiving manners, one manner is that R repeated transmissions correspond to the same information and the other manner is to classify information according to the total number of receiving manners, that is, information having the same number of receiving manners has the same number of repeated transmissions. For example, the common message is a paging message, the paging message includes paging information of terminals 1 to 4, and the terminal 1, terminal 2 terminal 3 and terminal 4 have 1 receiving manner, 2 receiving manners, 2 receiving manners and 4 receiving manners respectively. If the paging message is transmitted on 4 time-domain symbols, then the paging message of the terminal 1 is only transmitted on one symbol, the paging message of the terminal 2 is transmitted on two symbols, the paging message of the terminal 3 is transmitted on two symbols, and the paging message of the terminal 4 is transmitted on 4 symbols. As a result, among the 4 time-domain symbols, one time-domain symbol is used to transmit 4 users' paging messages, 2 time-domain symbols are used to transmit 3 users' paging messages and one time-domain symbol is used to transmit 4 user's paging messages. The paging messages transmitted sequentially in the time domains of the 4 symbols include sequentially decreased or increased paging elements. One paging element in one paging message corresponds to the identifier of one user.

As shown in FIG. 9d, in the repeated time division transmissions of the same transmission resource, the paging information transmitted in each time-division resource is different. User 1's paging message is only transmitted on one time-division resource, and user 4's paging message is transmitted on 4 repeated resources. In this case, the user 4 searches for the paging message by using different receiving manners on the 4 time-division resources, but the paging messages on different time-division resources have different lengths.

In a first solution, on each time-division resource, the common control signaling indicates the resource occupied by the paging message and the length information of the paging message. In a second solution, the common control information does not include the common control signaling, and only the paging message is transmitted. In this case, the terminal performs blind detection among the lengths of multiple paging messages on each time-division resource. A third solution is to transmit paging messages in blocks, and each block includes a fixed number of paging message lengths.

A receiving end obtains, by using a terminal identification signal, the blind detection range of the paging message at the receiving end. As shown in FIG. 9e, each terminal detects the same length of paging message on different time-division resources for repeated transmimission. In this case, each terminal can obtain the detection range of its paging message through the corresponding Temporary Mobile Subscriber Identity (TMSI) information.

For example, a user group involved in one paging opportunity includes {user 1 to user 10}, the 10 users are divided into 4 groups, and the same group of users use the same search space for detecting paging messages or use the same scrambling information for detecting paging messages. The search space for detecting the paging message by a user is obtained according to at least one of the user identification number and the total number of receiving manners. The user identification number may be UE_ID information in LTE. For example, the UE_ID information is obtained according to TMSI information.

In the preceding implementation, one basic block may include multiple users, the total number of currently paged users may be small, and the terminal may also blindly detect the length of the paging message in one group. In FIG. 9e, different terminals occupy the same position on multiple time-division resources for repeated transmission. Different terminals may occupy hopping frequency-domain positions on multiple time-division resources for repeated transmission. FIGS. 9d to 9e show the manner of repeated transmission of the transmission resource 0. The transmission resource 1 to transmission resource (M−1) may also use this manner of repeated transmission.

Embodiment Three

This embodiment relates to the number of aggregation degrees and the total number of search spaces. In this embodiment, common control information is transmitted on M time-domain resources, each time-domain resource includes N time-domain symbols, and the common control information includes at least one of the following: a common message and a common control signaling. The common control signaling is used for indicating configuration information about the common message.

In a first implementation, each of the M time-domain resources includes a first type of common control information, and the first type of common control information includes a common control signaling and a common message, where the common control signaling indicates transmission of the common message. As shown in FIGS. 8a to 8c, the common control signaling corresponds to a specific aggregation degree, and the total number of candidate control channel resources per aggregation degree is L.

Optionally, the time-domain resource satisfies at least one of the following conditions: in a set of time-domain resources, the coding rate of the common control information is fixed; and in one time-domain resource, one common control information corresponds to one aggregation degree and the aggregation degree is fixed. The aggregation degree is fixed, that is, the total number of time-frequency domain resources occupied by one common control signaling is fixed. The total number of candidate control channel resources included in one search space per aggregation degree is 1, that is, one aggregation degree corresponds to one candidate control channel, that is, the time-frequency resources occupied by the common control signaling are fixed.

In a second implementation, an aggregation degree corresponding to one common control information in one time-domain resource or the total number of candidate control channel resources in one search space per aggregation degree is determined by at least one of the following: a manner of being notified by common control information; a manner of being determined by a system bandwidth; and a manner of being determined by the total number of demodulation reference signal ports corresponding to the one time-domain resource.

For example, the aggregation degree is {4 Control Channel Elements (CCEs), 8 CCEs}. An aggregation degree of 4 CCEs correspond to 2 candidate control channel resources. There is one candidate control channel resource in the candidate control channels corresponding to an aggregation degree of 8 CCEs. The time-frequency resources in the candidate control channel resources under the two aggregation degrees may overlap, reducing terminal demodulation complexity. The CCE may be a basic mapping unit of a control channel in LTE.

In a second implementation, each of the M time-domain resources includes a second type of common control information, and the second type of common control information includes only a common message. The length of the common message in the second type of common control message may be variable, such as a paging message. The base station dynamically determines the transmission length of the paging message according to the current demand, that is, the paging message may include paging of one user, and may also include paging of multiple users.

Assuming that the length of the second type of common control information is variable, the terminal can blindly detect lengths of multiple common message. If time-domain resources corresponding to the common message having different lengths include different values of N, the terminal can perform blind detection in the case of different assumed values of N, that is, the terminal can blindly detect the length of the common message and the value of N included in each time-domain resource separately.

Optionally, the ranges of blind detection may be different if the values of N and the lengths of the common message change. For example, if the value of N is 1, the blind detection range of the length of the common message is a length set 1 {length 1, length 2}; if the value of N is 2, the blind detection range of the length of the common message is a length set 2 {length 3, length 4}. Optionally, the length in {length 3, length 4} is greater than the length in {length 1, length 2}. Optionally, the maximum value of the length in {length 3, length 4} is greater than the minimum value of the length in {length 1, length 2}.

An intersection may be existed between the length set 1 and the length set 2. For example, the common message is a paging message, and the length of the paging message is a length before the channel coding of the paging message. The length before the channel coding may cause the total number of occupied time-frequency resources after the channel coding to be different.

In the second implementation in which only the common message is transmitted and the length of the common message is variable, the search space of the paging message of the user may be obtained according to the terminal identification number. This improves the resource utilization rate and the blind detection range of the length of the paging message.

As shown in FIG. 9f, multiple paging messages (abbreviated as PMS in FIG. 9f) can be simultaneously transmitted on each time-domain resource, and multiple users can be paged in one paging message. In one time-domain resource, multiple paging messages can be distinguished from each other by the detection range of the paging message and the scrambling manner of the paging message. The detection range of the paging message and the scrambling manner of the paging message can be obtained according to the terminal identification number.

In an example, one paging opportunity corresponds to user 1 to user 40, and the users are divided into four groups {user 1 to user 10}, {user 11 to user 20}, {user 21 to user 30}, and {user 31 to user 40}. The four groups sequentially correspond to the paging message 0 to the paging message 3 in FIG. 9f. In FIG. 9f, the frequency-domain resources corresponding to the same paging message in the M time-domain resources are fixed. In an embodiment, the frequency-domain resources corresponding to the same paging message in the M time-domain resources may hop in a certain manner. For example, the search space of one paging message in one time-domain resource is determined according to an index of the time-domain resource and an index of the paging message. Different paging messages in one time-domain resource in FIG. 9f are in frequency-division mode.

The detection spaces of different paging messages can also overlap in the frequency domain. At least one of the following information of each paging message is blindly detected: the length of the paging message, the aggregation degree of the paging message, and candidate control channel resources per aggregation degree. One paging opportunity consists of the M time-domain resources, and one paging opportunity may also occur periodically. The common message on the paging opportunity can be transmitted as needed. The paging opportunity is similar to a type of subframe determined by (PF, i_s) in LTE. Each subframe in this type of subframe corresponds to the M time-domain resources herein.

In a third implementation in which only the common message is transmitted and the length of the common message is variable, paging messages are divided into basic units, each of the units includes a paging message and a control signaling, and the signaling indicates at least one of the following information: indicating whether the current unit is the last unit, indicating the unit index of the current unit, the total number of units, the time-frequency domain resources where the next unit is located, and a sub-block of the common message. Optionally, each of the basic units corresponds to the same number of bits, reducing the complexity of blind detection of the terminal.

Embodiment Four

This embodiment describes the distribution of physical positions of M*N time-domain symbols.

In a first implementation, M*N time-domain symbols are in T1 consecutive subframes, and M*N time-domain symbols occupy the entire subframe in each subframe. For example, if M*N=56 and each subframe includes 14 time-domain symbols, then 56 time-domain symbols occupy 4 consecutive subframes, occupying 14 time-domain symbols in each subframe, that is, symbols in each subframe are all occupied by time-domain symbols on which common control information is transmitted.

In a second implementation, M*N time-domain symbols are in T1 consecutive subframes, and M*N time-domain symbols occupy part of time-domain symbols in each subframe and do not occupy the entire subframe in each subframe. For example, if M*N=56 and each subframe includes 14 time-domain symbols, then 56 time-domain symbols occupy 8 consecutive subframes, occupying 7 time-domain symbols in each subframe, that is, symbols in each subframe are partially occupied by time-domain symbols on which common control information is transmitted. The remaining symbols can be used to transmit general service data and private control information.

In a first implementation, M*N time-domain symbols are in T1 discrete subframes, and M*N time-domain symbols occupy the entire subframe in each subframe. For example, if M*N=56 and each subframe includes 14 time-domain symbols, then 56 time-domain symbols occupy 4 discrete subframes, occupying 14 time-domain symbols in each subframe, that is, symbols in each subframe are all occupied by time-domain symbols on which common control information is transmitted. The discrete 4 subframes are preferably equally spaced or distributed according to a certain rule.

In a second implementation, M*N time-domain symbols are in T1 discrete subframes, and M*N time-domain symbols occupy part of time-domain symbols in each subframe and do not occupy the entire subframe in each subframe. For example, if M*N=56 and each subframe includes 14 time-domain symbols, then 56 time-domain symbols occupy 8 discrete subframes, occupying 7 time-domain symbols in each subframe, that is, symbols in each subframe are partially occupied by time-domain symbols on which common control information is transmitted. The remaining symbols can be used to transmit general service data and private control information. The discrete 8 subframes are preferably equally spaced or distributed according to certain rules.

Figure 10A:
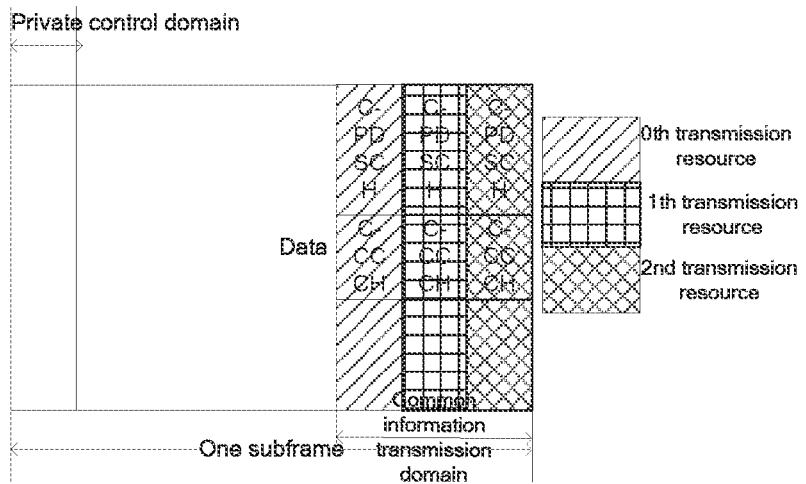
FIG. 10a illustrates an example in which symbols of common control information are at the end of the downlink transmission domain of one subframe according to an embodiment of the present disclosure.
Figure 10B:
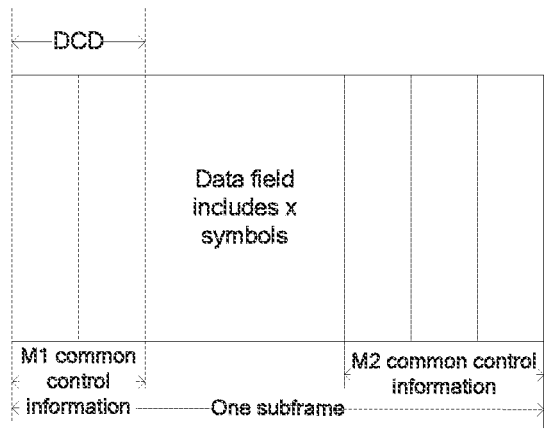
FIG. 10b illustrates example one in which among symbols of common control information, M1 time-domain resources are at the beginning of the downlink transmission domain of a subframe and M2 time-domain resources are at the end of the downlink transmission domain of the subframe according to an embodiment of the present disclosure.
Figure 10C:
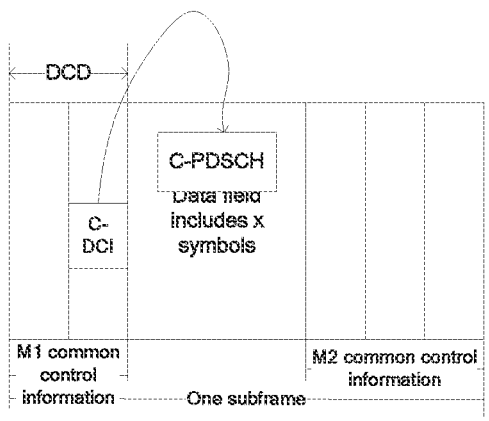
FIG. 10c illustrates example two in which among symbols of common control information, M1 time-domain resources are at the beginning of the downlink transmission domain of a subframe and M2 time-domain resources are at the end of the downlink transmission domain of the subframe according to an embodiment of the present disclosure.
Figure 11A:
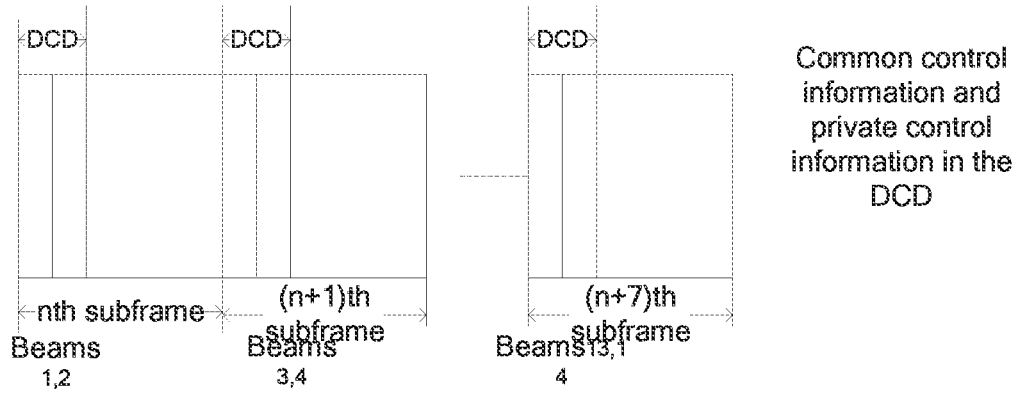
FIG. 11a illustrates an example of a third transmission manner according to an embodiment of the present disclosure.

When the total number of time-domain symbols for transmitting common control information in one subframe is less than the total number of time-domain symbols included in the subframe, for example, when the total number of symbols allocated to common control information in one subframe is less than the total number of the time-domain symbols included in the subframe or when all M time-domain resources corresponding to common control information fail to occupy the entire subframe, common control information in one subframe may be at the end of the downlink transmission domain of one subframe, as shown in FIG. 10a; or common control information in one subframe is all at the beginning of the downlink control domain (abbreviated as DCD in FIG. 11a), as shown in FIG. 11a; or one part is at the beginning of the downlink control domain and another part is at the end of the downlink transmission domain, as shown in FIG. 10b, for example, M1 common control information are at the beginning of the downlink control domain of the subframe and M2 common control information are at the end of the downlink transmission domain of the subframe, in which case M1 time-domain resources are all in the downlink control domain; or the M1 time-domain resources include the downlink control domain and the data transmission part, where the common control signaling in the M1 time-domain resources is in the downlink control domain and the common control signaling may indicate time-frequency resources where the common message is located, where the common message may occupy time-frequency resources in the data domain, as shown in FIG. 10c.

For the manner in FIG. 10b or FIG. 10c, for example, that is, among M time-domain resources corresponding to common control information, M3 time-domain resources need to be transmitted in one subframe, where M=M3 or M3<M. The indexes of the M3 transmission resource are known to a receiving end, M1 time-domain resources in the M3 time-domain resources are transmitted in the downlink control domain, and the remaining M2 time-domain resources are transmitted in the downlink transmission domain. The indexes of the M1 transmission resources transmitted in the downlink control domain are dynamically changed and transmitted as needed. A terminal first detects M1 time-domain resources in the downlink control domain, and determines M1 transmission resources transmitted thereon, and each of the remaining M2 transmission resources is transmitted on M1 time-domain resources of the M2 time-domain resources.

Embodiment Five

In this embodiment, the transmission manner of common control information is determined according to the type of the common control information or determined according to the total number of symbols required by the common control information.

Figure 11B:
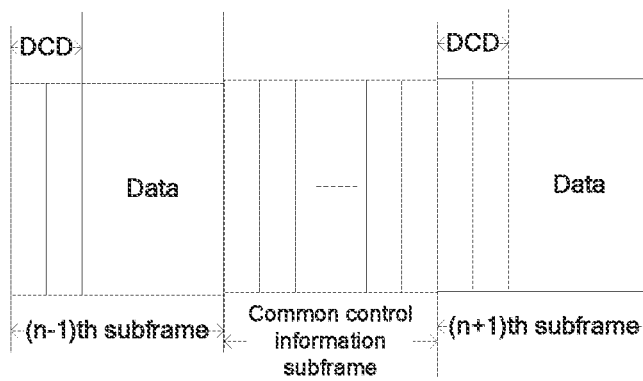
FIG. 11b illustrates example one of a fourth transmission manner according to an embodiment of the present disclosure.
Figure 11C:
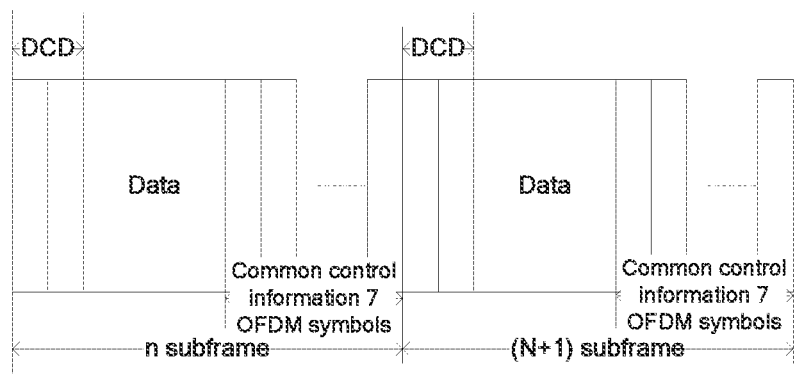
FIG. 11c illustrates example two of a fourth transmission manner according to an embodiment of the present disclosure.

For example, the total number of time-domain symbols required by the common control information is 14, and M=14, N=1, then the common control information can be transmitted in a third transmission manner as shown in FIG. 11a or in a fourth transmission manner as shown in FIG. 11b or FIG. 11c. In FIG. 11a, transmission of a common message is indicated by a common control signaling. The common message and general service data can be in frequency-division multiplexing mode, and the common control signaling and a private control signaling can be in frequency-division multiplexing mode, which is similar to the manner of System Information Blocks (SIB), Paging, RAR or TPC in LTE.

The subframe in which the common message is transmitted does not require special processing, and the common message can be transmitted in any subframe. The common control information is transmitted by using a dedicated time-domain symbol set in FIG. 11b or FIG. 11c. Optionally, the private control signaling and the common control signaling are in time-division multiplexing mode. Optionally, the common message and service data are in time-division multiplexing mode, and special processing is performed for the structure of the subframe in which the common message is transmitted. Optionally, the common message can appear in only a specific subframe and does not appear in all subframes.

In this embodiment, one manner is to determine whether to use the third transmission manner or the fourth transmission manner according to the total number of time-domain symbols required by the common control information. For example, if the total number of M*N is lower than a predetermined threshold, the third transmission manner is used, and if the total number of M*N is not lower than the predetermined threshold, the fourth transmission manner is used. The value of M may be determined according to the total number of time-domain symbols of a synchronization signal, and the value of N is determined according to the size of the content of the common control information. The value of M*N is the total number of time-domain symbols required by the common control information. The predetermined threshold is obtained according to the total number of time-domain symbols included in a dedicated control channel.

One manner is to determine whether to use the third transmission manner or the fourth transmission manner according to the type of the common control information. For example, when the delay requirement for the common message is relatively high, the third transmission manner is used, so that the common control information is transmitted as needed in any subframe. For example, when the common message is RAR or TPC (these common messages may also be referred to as group common control messages, because their target users are not users in the entire cell, but part of the users; these common messages may be transmitted by using part of transmission resources, and not by using all beams to achieve cell coverage), the third transmission manner is used; when the common message is Paging or SIB, the fourth transmission manner is used.

In this embodiment, the transmission manner of the common control information is determined according to the type of the common control information; and it is determined whether to use the common control signaling to indicate transmission of the common message or to only transmit the common message according to whether the message length of the common control information is fixed or variable. For example, if the message length of the common control information is fixed, only the common message is transmitted; if the message length of the common control information is variable, the common control signaling is used to indicate transmission of the common message.

In this embodiment, the transmission manner of the common control information is determined according to the type of the common control information; and it is determined whether to use the common control signaling to indicate transmission of the common message or to only transmit the common message according to the message length of the common control information. For example, if the length is short, only the common message is transmitted; if the length is long, the common control signaling is used to indicate transmission of the common message.

In this embodiment, the transmission manner of the common control information is determined according to the type of the common control information; and it is determined whether to use the common control signaling to indicate transmission of the common message or to only transmit the common message according to whether the common control information is transmitted as needed. For example, if the message length of the common control information is fixed, only the common message is transmitted; if the common control information is transmitted as needed, the common control signaling is used to indicate transmission of the common message.

In this embodiment, the transmission manner of the common control information is determined according to the type of the common control information; and it is determined whether to use the common control signaling to indicate transmission of the common message or to only transmit the common message according to delay requirements of the common control information. For example, the common message with a low delay requirement is transmitted in the fourth transmission manner shown in FIG. 11b or FIG. 11c; the common message with a high delay requirement is transmitted in the third transmission manner shown in FIG. 11a. When the common control information corresponds to multiple time-domain resources, the common control information is transmitted in multiple subframes as shown in FIG. 11a. In FIG. 11a, the common message requires 14 OFDM symbols. Since only two OFDM symbols exist in the downlink control domain in each subframe, the common control information is transmitted in 7 subframes. If the total number of time-domain symbols required by the common control information is less than or equal to two, the common control information may also be transmitted in one subframe.

Embodiment Six

In this embodiment, for each value of N, a terminal obtains the time-domain symbol position where the set of time-domain resources is located, logically numbers the M*N time-domain symbols $0, \ldots, M*(N-1)$ by time, and determines N time-domain symbols included in each time-domain resource by using one of the manners described below.

In a first implementation, the N time-domain symbols corresponding to the ith transmission resource are logically numbered as $i*N+j$, $j=0, 1, 1$, where $0 \leq i \leq M-1$.

In a second implementation, the N time-domain symbols corresponding to the ith transmission resource are $M*n+i$, where $0 \leq i \leq M-1$, $0 \leq n \leq N-1$.

Embodiment Seven

In this embodiment, each of M time-domain resources includes a different number of time-domain symbols.

For example, when common control information and private control information are in frequency multiplexing mode, different time-domain resources require different time-domain symbols. For example, some time-domain resources have private control information, and some time-domain resources do not have private control information.

The receiving manner includes one or more of the following: a receiving beam, a receiving port, a receiving antenna, receiving time, a receiving frequency domain, the maximum number of receiving manners of the receiving end, or the total number of different receiving manners used to receive the same time-domain resource.

This embodiment provides a computer-readable storage medium configured to store computer-executable instructions for executing the method in any preceding embodiment.

Figure 12:
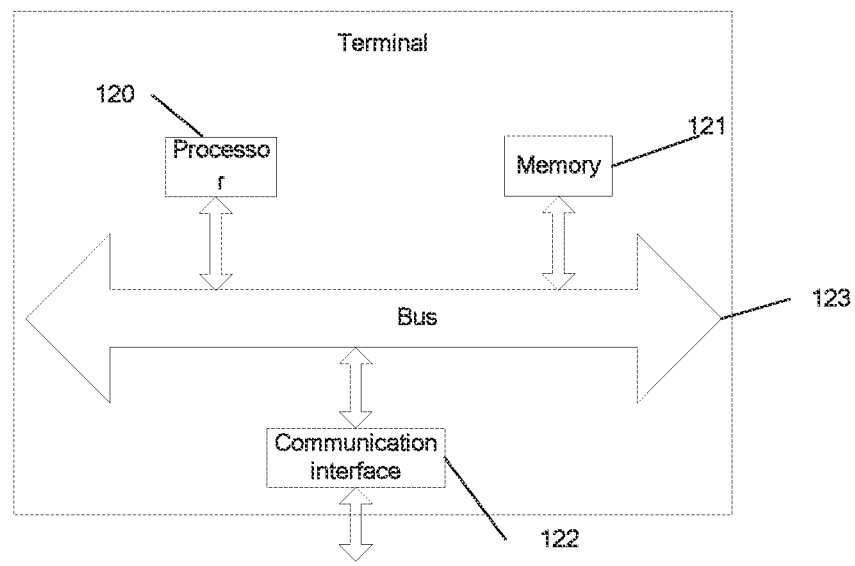
FIG. 12 is a schematic diagram illustrating the hardware structure of a terminal according to an embodiment of the present disclosure.

An embodiment provides a schematic diagram illustrating a hardware structure of a terminal. Referring to FIG. 12, the terminal includes at least one processor 120 (FIG. 12 shows one processor 120 by way of example) and a memory 121 and. The terminal may further include a communication interface 122 and a bus 123. The processor 120, the memory 121 and the communication interface 122 may communicate with each other through the bus 123. The processor 120 may call logic instructions in the memory 121 to perform the method in the preceding embodiments.

In addition, the logic instructions in the memory 121 may be implemented in the form of a software function unit and, when sold or used as an independent product, may be stored in a computer-readable storage medium.

As a computer-readable storage medium, the memory 121 may be used for storing software programs and computer-executable programs, such as program instructions or modules corresponding to the method in the preceding embodiments. The processor 120 runs the software programs, instructions or modules stored in the memory 121 to perform function applications and data processing, that is, to implement the method in the preceding embodiments.

The memory 121 may include a program storage region and a data storage region, where the program storage region may store an operating system and an application program required by at least one function while the data storage region may store data created depending on use of a terminal device. In addition, the memory 121 may include a high-speed random access memory, and may further include a non-volatile memory.

Figure 13:
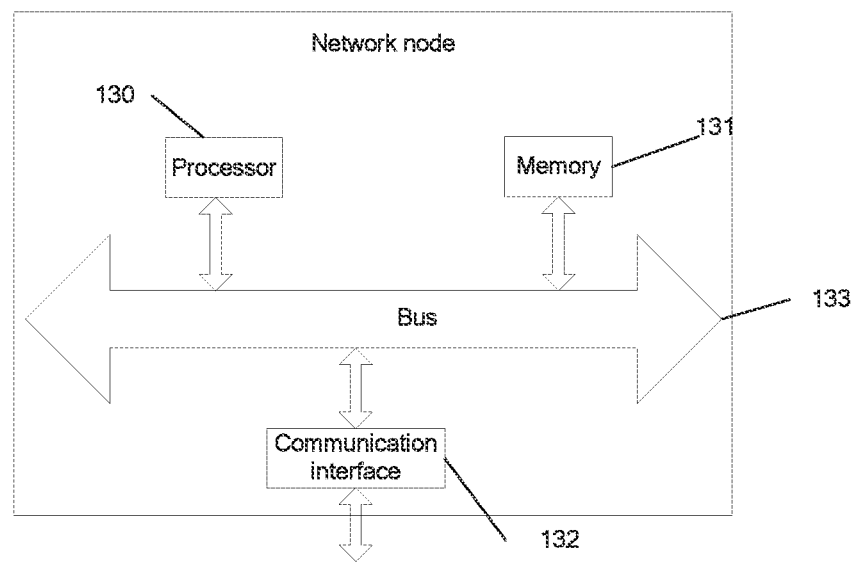
FIG. 13 is a schematic diagram illustrating the hardware structure of a network node according to an embodiment of the present disclosure.

An embodiment provides a schematic diagram illustrating a hardware structure of a network node. Referring to FIG. 13, the network node includes at least one processor 130 (FIG. 13 shows one processor 130 by way of example) and a memory 131. The network node may further include a communication interface 132 and a bus 133. The processor 130, the memory 131 and the communication interface 132 may communicate with each other through the bus 133. The processor 130 may call logic instructions in the memory 131 to perform the method in the preceding embodiments.

In addition, the logic instructions in the memory 131 may be implemented in the form of a software function unit and, when sold or used as an independent product, may be stored in a computer-readable storage medium.

As a computer-readable storage medium, the memory 131 may be used for storing software programs and computer-executable programs, such as program instructions or modules corresponding to the method in the preceding embodiments. The processor 130 runs the software programs, instructions or modules stored in the memory 131 to perform function applications and data processing, that is, to implement the method in the preceding embodiments.

The memory 131 may include a program storage region and a data storage region, where the program storage region may store an operating system and an application program required by at least one function while the data storage region may store data created depending on use of a terminal device. In addition, the memory 131 may include a high-speed random access memory, and may further include a non-volatile memory.

The preceding technical solutions may be embodied in the form of a software product that is stored in a storage medium and includes one or more instructions for enabling a computer device (which may be a personal computer, server, or network device, etc.) to perform all or part of the steps of the method in the preceding embodiments. The preceding storage medium may be a non-transient storage medium, such as a U disk, mobile hard disk, read only memory (ROM), random access memory (RAM), magnetic disk, optical disk or another medium that can store program codes, or may be a transient storage medium.

INDUSTRIAL APPLICABILITY

The method, apparatus and device for transporting common control information capable of flexibly scheduling data signals.

What is claimed is:

1. A method for transporting common control information, comprising:
   transmitting, by a transmitting end, the common control information on M time-domain resources through M transmission beams, wherein each of the M time-domain resources comprises N time-domain symbols, wherein
   one time-domain resource of the M time-domain resources where the common control information of each of the M transmission beams is located is respectively determined according to a beam index of the each transmission beam of the M transmission beams, wherein M and N are positive integers; and
   one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel.

2. The method of claim 1, wherein the N time-domain symbols of each of the M time domain resources have Y types of subcarrier spacing, and Y is an integer greater than 1; and
   the common control information and at least one of the following are frequency division multiplexed: the synchronization signal, the broadcast channel or a measurement reference signal.

3. The method of claim 1, wherein
   the M*N time-domain symbols included in the M time-domain resources of the common control information are distributed over more than one time unit, and a number of time-domain symbols occupied by the M*N time-domain symbols in each of the more than one time unit is less than a number of time-domain symbols of the each time unit.

4. The method of claim 3, wherein, the method satisfied at least one of the following:
   the M*N time-domain symbols included in the M time-domain resources of the common control information are distributed in continuous multiple time units;
   the M*N time-domain symbols included in the M time-domain resources of the common control information are distributed in multiple time units and each of the multiple time units includes N1 time-domain symbols of the M*N time-domain symbols, wherein N1 is an integer less than M*N;

the M*N time-domain symbols included in the M time-domain resources of the common control information are divided into [(M*N)/T1] subunits, and the [(M*N)/T1] subunits are equally spaced, wherein T1 denotes a maximum number of time-domain symbols included in one subunit, and T1 is an integer greater than or equal to 1;

M1 time-domain resources among the M time-domain resources of the common control information are located at a beginning of a downlink transmission domain in one time unit, and the one time unit includes M3 time-domain resources among the M time-domain resources, wherein M1 and M3 are positive integers less than M; or an interval between a starting symbol of each time-domain resource of the M time-domain resources of the common control information and a starting symbol of a time unit where the each time-domain resource is located is 0 and the time unit includes M3 time-domain resources of the M time-domain resources, wherein M3 is an positive integers less than M.

5. The method of claim 1, wherein one time-domain resource where the common control information of each of the M transmission resources beams is located is respectively determined according to a beam index of the each transmission beam and the value of N.

6. The method of claim 1, wherein,
the value of N is obtained according to the following information: a system bandwidth and subcarrier spacing;
the value of N belongs to a set having at least two positive integers; and
the value of N is transmitted to a receiving end in the broadcast channel.

7. The method of claim 1, wherein each T first time units includes one time-domain resource set, and the one time-domain resource set is composed of the M time-domain resources, wherein T is an integer multiple of a transmission period of a first common signal, and the first common signal comprises the following signals: the synchronization signal, and the broadcast channel.

8. The method of claim 1, wherein the common control information comprises at least one of the following:
a common message; and
a common control signaling for indicating configuration information about the common message;
wherein the common message comprises at least one of the following: broadcast information, system message, paging message, or Random Access Response (RAR) message.

9. A method for transporting common control information, comprising:
determining, by a receiving end, a time-domain resource where the common control information of a transmission beam is located according to a beam index of the transmission beam;
detecting, by the receiving end, the common control information in the determined time-domain resource;
wherein the time-domain resource is a time-domain resource of M time-domain resources of the common control information and each of the M time-domain resources comprises N time-domain symbols;
the transmission beam is a transmission beam of M transmission beams and each of the M transmission beams corresponds to one time-domain resource of the M time-domain resources of the common control information; and one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel;

wherein M and N are positive integers.

10. The method of claim 9, wherein the method further comprises:
determining, by the receiving end, the beam index of the transmission beam where the receiving end is located, and detecting only the common control information in the time-domain resource corresponding to the transmission beam where the receiving end is located among the M time-domain resources;
determining, by the receiving end, the transmission beam where the receiving end is located according to the synchronization signal.

11. The method of claim 9, wherein the N time-domain symbols of each of the M time domain resources have Y types of subcarrier spacing, and Y is an integer greater than 1; and
the common control information and at least one of the following are frequency division multiplexed: the synchronization signal, the broadcast channel or a measurement reference signal.

12. The method of claim 9, wherein the M*N time-domain symbols included in the M time-domain resources of the common control information are distributed over more than one time unit, and a number of time-domain symbols occupied by the M*N time-domain symbols in each of the more than one time unit is less than a number of time-domain symbols of the each time unit.

13. The method of claim 12, wherein, the method satisfied at least one of the following:
the M*N time-domain symbols included in the M time-domain resources of the common control information are distributed in continuous multiple time units;
the M*N time-domain symbols included in the M time-domain resources of the common control information are distributed in multiple time units and each of the multiple time units includes N1 time-domain symbols of the M*N time-domain symbols, wherein N1 is an integer less than M*N;
the M*N time-domain symbols included in the M time-domain resources of the common control information are divided into [(M*N)/T1] subunits, and the [(M*N)/T1]subunits are equally spaced, wherein T1 denotes a maximum number of time-domain symbols included in one subunit, and T1 is an integer greater than or equal to 1;
M1 time-domain resources among the M time-domain resources of the common control information are located at a beginning of a downlink transmission domain in one time unit, and the one time unit includes M3 time-domain resources among the M time-domain resources, wherein M1 and M3 are positive integers less than M; or
an interval between a starting symbol of each time-domain resource of the M time-domain resources of the common control information and a starting symbol of a time unit where the each time-domain resource is located is 0 and the time unit includes M3 time-domain resources of the M time-domain resources, wherein M3 is an positive integers less than M.

14. The method of claim 9, wherein one time-domain resource where the common control information of each of the M transmission resources beams is located is respectively determined according to a beam index of the each transmission beam and the value of N.

15. The method of claim 9, wherein,
the value of N is obtained according to the following information: a system bandwidth and subcarrier spacing;
the value of N belongs to a set having at least two positive integers; and
the value of N is transmitted to the receiving end in the broadcast channel.

16. The method of claim 9, further comprising:
obtaining a symbol having a minimum index among N time-domain symbols of $i^{th}$ time domain resource of the M time domain resources according to i*N, wherein $0 \leq i \leq M-1$, wherein $i^{th}$ time domain resource of the M time domain resources corresponds to $i^{th}$ transmission beam of the M transmission beams.

17. The method of claim 9, wherein each T first time units includes one time-domain resource set, and the one time-domain resource set is composed of the M time-domain resources, wherein T is an integer multiple of a transmission period of a first common signal, and the first common signal comprises the following signals: the synchronization signal, and the broadcast channel.

18. The method of claim 9, wherein the common control information comprises at least one of the following:
a common message; and
a common control signaling for indicating configuration information about the common message;
wherein the common message comprises at least one of the following: broadcast information, system message, paging message, or Random Access Response (RAR) message.

19. An apparatus for transporting common control information, comprising a processor and a storage device, wherein the storage device stores processor-executable programs, and the programs are configured to, when executed by the processor, implement the method for transporting common control information of claim 1.

20. An apparatus for transporting common control information, comprising a processor and a storage device, wherein the storage device stores a computer program executable by the processor, and the computer program comprises:
a receiving module configured to determine a time-domain resource where the common control information of a transmission beam is located according to a beam index of the transmission beam and detect the common control information in the determined time-domain resource;
wherein the time-domain resource is a time-domain resource of M time-domain resources of the common control information and each of the M time-domain resources comprises N time-domain symbols;
the transmission beam is a transmission beam of M transmission beams and each of the M transmission beams corresponds to one time-domain resource of the M time-domain resources of the common control information; and
one of M time-domain resources for a synchronization signal corresponds to one time-domain resource of the M time-domain resources of the common control information, a one-to-one correspondence exists between the M transmission beams and the M time-domain resources for the synchronization signal; and a one-to-one correspondence exists between the M transmission beams and M time-domain resources of a broadcast channel;
wherein M and N are positive integers.

* * * * *